(12) United States Patent
Karabed

(10) Patent No.: US 10,654,422 B2
(45) Date of Patent: May 19, 2020

(54) VIEW FRIENDLY MONITOR SYSTEMS

(71) Applicant: Razmik Karabed, San Jose, CA (US)

(72) Inventor: Razmik Karabed, San Jose, CA (US)

( * ) Notice: Subject to any disclaimer, the term of this patent is extended or adjusted under 35 U.S.C. 154(b) by 122 days.

(21) Appl. No.: 15/854,558

(22) Filed: Dec. 26, 2017

(65) Prior Publication Data

US 2018/0118130 A1 May 3, 2018

Related U.S. Application Data

(63) Continuation-in-part of application No. 15/388,856, filed on Dec. 22, 2016, now abandoned, which is a
(Continued)

(51) Int. Cl.
| | |
|---|---|
| *B60R 11/04* | (2006.01) |
| *B60R 11/02* | (2006.01) |
| *G06K 9/00* | (2006.01) |
| *G06K 9/32* | (2006.01) |
| *B60R 1/00* | (2006.01) |

(52) U.S. Cl.
CPC ............ *B60R 11/0229* (2013.01); *B60R 1/00* (2013.01); *B60R 11/04* (2013.01); *G06K 9/00255* (2013.01); *G06K 9/00261* (2013.01); *G06K 9/00791* (2013.01); *G06K 9/3233* (2013.01); *B60R 2300/105* (2013.01); *B60R 2300/20* (2013.01); *B60R 2300/8006* (2013.01)

(58) Field of Classification Search
None
See application file for complete search history.

(56) References Cited

U.S. PATENT DOCUMENTS

| | | |
|---|---|---|
| 6,549,641 B2 | 4/2003 | Ishikawa et al. |
| 8,549,415 B2 | 10/2013 | Tang |

(Continued)

FOREIGN PATENT DOCUMENTS

| | | |
|---|---|---|
| EP | 2421275 A2 | 2/2012 |
| JP | 2011188028 A | 9/2011 |

OTHER PUBLICATIONS

International Search Report & Written Opinion dated Oct. 27, 2017 from International PCT Application No. PCT/US2017/047594.
(Continued)

*Primary Examiner* — Christopher G Findley
(74) *Attorney, Agent, or Firm* — Makoui Law, PC; Ali Makoui

(57) ABSTRACT

A view friendly monitor system provides a monitor and a sequence of views that are regions of interest. The monitor can display a region of the camera view; the system is configured such that the displayed region of the camera view is a region of interest to the user. The displayed portion of the camera view changes to match the changing interests of the user. For example, a user that is interested to see a view in a direction beyond a certain edge of the monitor would move her head generally in an opposite direction. To see farther outside the edge, she needs to move her head farther in the opposite direction. In response to her head movement, the view friendly monitor system would change the region of interest based on the direction and the length of her head movement and display the new region of interest on the monitor.

21 Claims, 14 Drawing Sheets

Related U.S. Application Data continuation-in-part of application No. 15/277,637, filed on Sep. 27, 2016, now abandoned.

(60) Provisional application No. 62/380,492, filed on Aug. 29, 2016.

(56) References Cited

U.S. PATENT DOCUMENTS

| | | | |
|---|---|---|---|
| 8,643,703 B1 * | 2/2014 | Karakotsios | G09G 5/00 348/47 |
| 8,797,263 B2 | 8/2014 | Kim | |
| 8,926,475 B2 | 1/2015 | Lin et al. | |
| 9,092,053 B2 | 7/2015 | Kerr et al. | |
| 9,167,289 B2 | 10/2015 | Stinson et al. | |
| 9,223,400 B2 | 12/2015 | Lin et al. | |
| 9,224,060 B1 * | 12/2015 | Ramaswamy | G06K 9/00912 |
| 9,274,597 B1 | 3/2016 | Karakotsios et al. | |
| 9,285,883 B2 | 3/2016 | Bi et al. | |
| 9,787,939 B1 | 10/2017 | Beguin et al. | |
| 2002/0124260 A1 | 9/2002 | Rivera | |
| 2004/0239687 A1 | 12/2004 | Idesawa et al. | |
| 2008/0052638 A1 | 2/2008 | Frank et al. | |
| 2008/0088624 A1 | 4/2008 | Long et al. | |
| 2008/0225123 A1 | 9/2008 | Osann et al. | |
| 2009/0051699 A1 | 2/2009 | Posa et al. | |
| 2009/0059023 A1 | 3/2009 | Sasaki | |
| 2009/0313584 A1 | 12/2009 | Kerr et al. | |
| 2010/0171691 A1 | 7/2010 | Cook et al. | |
| 2011/0090149 A1 | 4/2011 | Larsen et al. | |
| 2011/0140919 A1 | 6/2011 | Nara et al. | |
| 2012/0229616 A1 | 9/2012 | Koike et al. | |
| 2013/0100123 A1 | 4/2013 | Hakoda et al. | |
| 2013/0229482 A1 | 9/2013 | Vilcovsky et al. | |
| 2013/0314581 A1 | 11/2013 | Kido | |
| 2014/0226000 A1 | 8/2014 | Vilcovsky et al. | |
| 2014/0293057 A1 | 10/2014 | Wierich | |
| 2015/0070742 A1 | 3/2015 | Sorek et al. | |
| 2015/0154439 A1 | 6/2015 | Anzue et al. | |
| 2015/0241961 A1 | 8/2015 | Morris et al. | |
| 2015/0332090 A1 | 11/2015 | Kumamoto | |
| 2016/0085301 A1 | 3/2016 | Lopez | |
| 2016/0156838 A1 | 6/2016 | Cheng et al. | |
| 2016/0257252 A1 | 9/2016 | Zaitsev et al. | |
| 2016/0280136 A1 | 9/2016 | Besson | |
| 2016/0288717 A1 | 10/2016 | Kameshima et al. | |
| 2017/0053191 A1 | 2/2017 | Koyama | |
| 2017/0053456 A1 | 2/2017 | Cho et al. | |
| 2017/0140227 A1 | 5/2017 | Takemura et al. | |
| 2017/0282796 A1 | 10/2017 | Kosaki | |
| 2017/0310906 A1 | 10/2017 | Onaka | |

OTHER PUBLICATIONS

Office Action dated Mar. 28, 2018 from U.S. Appl. No. 15/277,637.

* cited by examiner

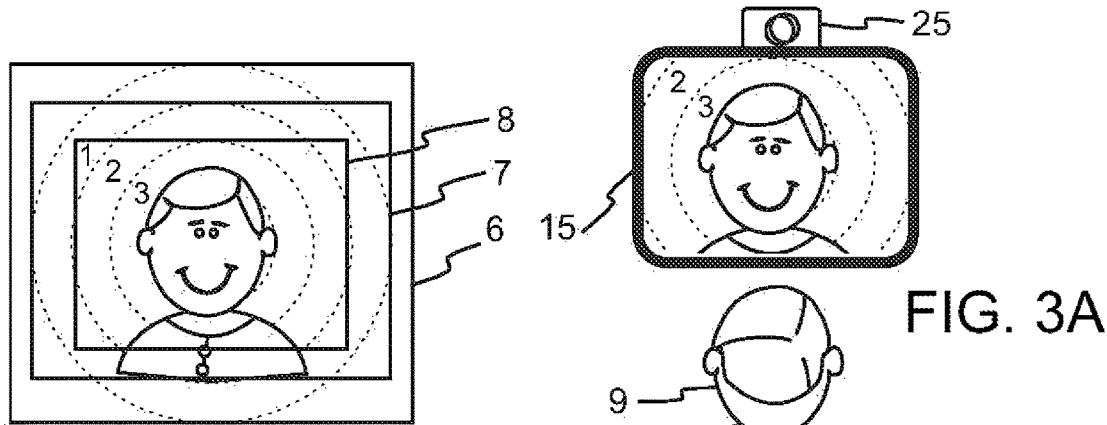
FIG. 3B
FIG. 3A
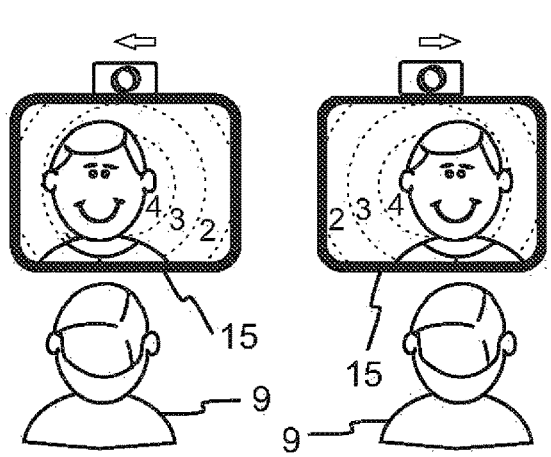
FIG. 3C  FIG. 3D
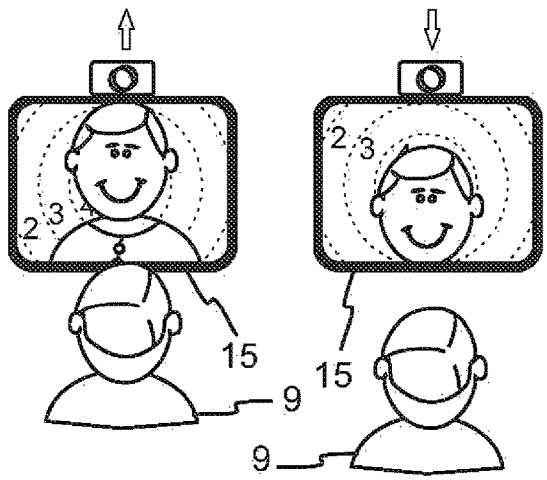
FIG. 3E  FIG. 3F

VIEW FRIENDLY MONITOR SYSTEMS

CROSS-REFERENCE TO RELATED APPLICATIONS

This application is a continuation-in-part of U.S. patent application Ser. No. 15/388,856, filed Dec. 22, 2016, currently pending, which is a continuation-in-part of U.S. patent application Ser. No. 15/277,637 filed Sep. 27, 2016, currently pending, which claims the benefit of U.S. provisional application No. 62/380,492, filed Aug. 29, 2016, the contents of all of which are herein incorporated by reference.

BACKGROUND OF THE INVENTION

1. Field of the Invention

One or more embodiments of the invention relates generally to monitoring systems. More particularly, the invention relates to view friendly monitor systems that can, for example, assist a viewer to easily access areas of a view not initially displayed on a monitor, especially views just outside the periphery of the displayed view.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Digital monitors are used in more and more applications, from smartphones, cameras, and displays inside vehicles, to video games, and the like. FIG. 1A shows a digital view 10, which contains a region of general interest (ROGI) 20. In turn, the ROGI 20 contains a region of special interest (ROSI) 30. FIG. 1B depicts a monitor 40 having a display 35 that shows the ROSI 30. In applications that use a monitor, often there is a need for a friendly method that enables access to the ROGI 20. One may shrink the ROGI 20 and display it on the monitor 40, but, in general, this would undesirably scale down the image.

Example 1: Inside Vehicle Monitors

Referring to FIG. 2A, FIG. 2B and FIG. 2C, a first example is described where a vehicle 45 is depicted in FIG. 2A, a monitor 50 is inside the vehicle 45 as shown in FIG. 2B. The monitor 50 has a display 60. During reverse, the monitor 50 usually shows a region of special interest ROSI 85 on the display 60, toward the rear of the vehicle 45. Referring to FIG. 2A, a camera 46 installed at the rear of the vehicle 45 generates the views for the monitor 50.

The camera 46 may produce a view 70 as shown in FIG. 2C. The view 70 is toward the rear of the vehicle 45. In this case, the view 70 is of a typical driveway. The monitor only displays the ROSI 85, as shown in FIG. 2C. Although the ROSI 85 is in general of most importance while backing up from a driveway, nevertheless, the driver of the vehicle 45 may often desire to observe areas enclosed by a region of general interest ROGI 80. As shown in FIG. 2C, the ROGI 80 includes the ROSI 85. For instance, areas in the ROGI 80 below the ROSI 85 might reveal a cat 91 crossing the driveway, areas in the ROGI 80 above the ROSI 85 might reveal a dog 92 crossing the driveway, areas in the ROGI 80 to the right of the ROSI 85 might reveal a ball 93 approaching, and areas in the ROGI 80 to the left of the ROSI 85 might reveal a biker 90 crashing down, for example.

No friendly solution has enabled the driver to access areas in the ROGI 80 outside the ROSI 85 when the ROSI 85 is displayed on the display 60. Of course, one might display the ROGI 80 on the monitor 50 but this usually would require scaling down the view 80, which makes it harder for the driver of the vehicle 45 to recognize objects in the view 80.

Example 2: Pseudo Mirror Monitors

Referring to FIG. 3A through FIG. 3F, in a second example, smartphones and similar portable electronic devices have made many consumer products obsolete. Some innovators have tried to add pocket/purse mirrors to these devices. These innovators offer applications, or apps, that use the smartphone camera to generate a mirror type image on the smartphone monitor. One such innovator claims its app is better than using the phone camera, and offers the following advantages (1) simpler to use than one's phone's camera; (2) one-touch lighting control; (3) on-screen zoom function; (4) image freezing so there is no more need to open the photo gallery after every photo; (5) access to all captured images via the app gallery; and (6) no hassle photo sharing to selfie app or email.

However, these mirror type monitors lack a useful feature that is present in conventional mirrors. Referring to FIG. 3A, a boy 9 is shown facing a monitor 15 and a camera 25. The monitor 15 and the camera 25 are framed together. FIG. 3B shows a view 6 that is generated by the camera 25. The view 6 contains a region of a general interest (ROGI) 7, where the ROGI 7 contains a region of special interest (ROSI) 8. The monitor 15 displays the ROSI 8. In FIG. 3B, the background of the boy 3 is partitioned by dashed rings 1, 2, 3 and 4. The ring 1 is the outermost ring, next is the ring 2, and so on. The ring 4 is partially behind the boy 9 in FIG. 3B. Figures FIG. 3C through FIG. 3F depict cases where the boy 9 moves his head left, right, up and down, respectively, keeping the monitor 15 and the camera 25 stationary.

The monitor 15 displays the same background in FIG. 3C through FIG. 3F. However, the position of the boy 9 differs in FIG. 3C through FIG. 3F. Were there a mirror instead of the monitor 15, then the backgrounds would also be different in FIG. 3C through FIG. 3f It is this feature of conventional mirrors that is lacking in mirror type monitor applications for electronic devices. This "angle of reflection" feature enables one to access areas in the ROGI 7 that are outside the ROSI 8.

Example 3: Vehicle Side Monitor

Example 3 is described using FIG. 4A and FIG. 4B. FIG. 4A illustrates a vehicle side monitor 102. The monitor 102 replaces, for instance, the left side mirror of an automobile 106. FIG. 4B further illustrates a camera 101. The monitor 102 and the camera 101 are housed together. The monitor 101 displays an automobile 106.

FIG. 4B shows a view 103 that is generated by the camera 101. The view 103 contains a region of general interest (ROGI) 104, where the ROGI 104 contains a region of special interest (ROSI) 105. The monitor 102 displays the ROSI 105.

Again, although the ROSI 105 may be, in general, of most importance while driving, nevertheless, often the driver of the vehicle may desire to observe areas enclosed by the ROGI 104 that are not in the ROSI 105. For instance, areas in the ROGI 104 to the right of the ROSI 105 might reveal a motorcyclist 107, and areas in the ROGI 104 to the left of the ROSI 105 might show another automobile 108.

No friendly solution has enabled the driver to access areas in the ROGI 104 outside the ROSI 105. Again, of course, one might display the ROGI 104 on the monitor 101, but this usually would require scaling down the view 104, which makes it harder for the driver of the vehicle to recognize objects in the view 104.

Therefore, there is a need to easily access areas of a view not displayed on a monitor, especially views just outside the periphery of the displayed view. There is no friendly method to enable such access in prior art.

SUMMARY OF THE INVENTION

In accordance with the present invention, structures and associated methods are disclosed which address the shortcomings described above.

Embodiments of the present invention introduce view friendly monitors. A view friendly monitor system selects and displays a region of a view generally based on the location of a viewer's head relative to a predetermined location. For instance, if the viewer's head is to the right of the predetermined location, then the view friendly monitor system displays a region of the view to the left of a predetermined region. Thus, the viewer gets access to a region to the left of the displayed region by moving her head right. Generally, the farther right she moves her head, the farther to the left of the predetermined region a region would be displayed. Another instance is if the viewer's head is to the right of the predetermined location, then the view friendly monitor system displays a region of the view to the right of a predetermined region. Thus, the viewer gets access to a region to the left of the displayed region by moving her head left. Generally, the farther left she moves her head, the farther to the left of the predetermined region a region would be displayed.

Another view friendly monitor system selects and displays a region of a view generally based on the location of a viewer's head relative to a transitory head location.

For instance, when the view friendly monitor system is displaying a region of a view and the viewer's head moves generally sidewise by more than a predetermined distance, dx, from the transitory head location, then the view friendly monitor system performs the following tasks: 1) It selects a region of the view, according to a preset rule; the preset rule may be to select a region of the view that is a translation of the current region of view. The translation may be generally toward the right side if the viewer's head moves generally toward the left side, and the translation may be generally toward the left side if the viewer's head moves generally toward the right side, 2) it displays the selected region of the view, and 3) it updates the transitory head location to be the viewer's current head location.

Thus, the viewer gets access to different regions of the view by generally moving her head sidewise by more than distance, dx, to the right or to the left.

The advantages obtained include the following: 1) Embodiments of the present invention provide easy access to outside the periphery of a displayed view on a monitor; and 2) Such embodiments are very user friendly. For the first instance, the skill needed is simply the one each person uses when looking outside a window from a stationary place a few feet away from the window, or when looking into a mirror. More specifically, the skill needed is the way one moves their head in a direction opposite to the direction where one wants more view either in the mirror or outside a window.

In an aspect of the present invention, a view friendly monitor system is disclosed.

The system includes an image source, such as a first camera or a storage unit containing an image or a video file, the image source producing, f, images per second. Each image produced by the image source contains a region of general interest ROGI that itself contains a region of special interest ROSI. The ROGI may be the whole image or a proper subset of the whole image.

The system also includes a controller that receives images from the image source at a rate of f images per second.

The system also includes a monitor that displays the images it receives from the controller.

The system further includes a second camera configured to send images to the controller.

In one application, the first camera produces a view and sends it to the controller. The second camera also produces an image and sends it to the controller. The controller performs the following operations: The controller performs face detection on the received image from the second camera. If a face is not detected, then the controller displays the ROSI on the monitor. However, if a face is detected, then the controller selects a current region of interest, cROI, in the view of the first camera such that (1) the cROI is congruent to the ROSI, and (2) the relative location of the cROI with respect to the ROSI is a function of the relative position of the detected face with respect to a predetermined face location. Then, the controller displays the cROI on the monitor. Finally, the process repeats for the next view.

In another application, the first camera produces a view and sends it to the controller. The second camera also produces an image and sends it to the controller. The controller performs the following operations: The controller does face detection on the received image from the second camera. If a face is not detected, then the controller displays the ROSI on the monitor. But, if a face is detected, then (1) the controller generates the location (x, y) of the detected face, where the image of the second camera has ph horizontal pixels and pv vertical pixels, and (x, y) is measured from the lower left corner of the image, and it corresponds to a certain point in the face. (2) Next, the controller calculates the relative location of the detected face with respect to a predetermined face location (u, w), obtaining T, where T=(x−u, y−w), where again (u, w) is measured from the lower left corner of the image of the second camera. (3) The controller computes a translation vector=(−1)*alpha*T, where alpha is a scalar, and the controller generates a region of interest, cROI, in the view of the first camera by translating the ROSI by the translation vector. In other words, the translation vector is the additive inverse of alpha*T. Further, if alpha is set equal to 1, then the translation vector becomes the additive inverse of T. (4) Finally, the controller displays the cROI on the monitor. The process then repeats for the next view.

Hence the region of interest, cROI, is congruent to the ROSI and the translation vector, (−1)*alpha*T, is proportional to the head movement (T). If alpha is positive, then the translation vector is in an opposite direction to the head move, and if alpha is negative, then the translation vector is in a same direction as the head move. Without loss of generality, alpha is assumed positive from here on.

In another application, the first camera produces a view and sends it to the controller. The second camera also produces an image and sends it to the controller.

The controller displays a region of interest cROI that is a translation of the ROSI.

The controller runs as a finite state machine having two states: state 1 and state 2. The state 1=(a, b) where (a, b) is the location of a detected face in the previous image from the second camera, or it is (u, w) if no face was detected in the previous image, where (u, w) is a predetermined face location. The state 2 is the location of the cROI in the previous view of the first camera.

The controller is properly initialized and performs the following operations: The controller does face detection on the received image from the second camera. If a face is not detected, then the controller displays the ROSI on the monitor. But, if a face is detected, then (1) the controller generates the location (x, y) of the detected face, where the image of the second camera has ph horizontal pixels and pv vertical pixels, and (x, y) is measured from the lower left corner of the image, and it corresponds to a certain point in the face. (2) Next, the controller calculates the relative location of the detected face with respect to the state 1=(a, b), obtaining T=(x−a, y−b). (3) The controller computes a translation vector=(−1)*alpha*T, where alpha is a positive scalar, and the controller generates a current region of interest cROI in the view of the first camera by translating the state 2 by the translation vector. (4) Then, the controller displays the cROI on the monitor. (5) Finally, the controller updates the state 1 to be (x, y), and the state 2 to be the location of the current cROI.

Hence the region of interest, cROI, is congruent to the state 2 and the translation vector, (−1)*alpha*T, is proportional to the head movement between the previous image of the second camera and the current image of the second camera (T).

In yet another application, the controller does not allow the translation vector to move the cROI outside the ROGI of the first camera. It precludes such events by appropriately limiting the coordinates of the translation vector such that the cROI stops at the edges of the view of the ROGI of the first camera.

In a first exemplary embodiment, (1) the first camera and the second camera are distinct, and (2) the controller generally uses a translation vector that is based on the location of a detected face and a predetermined face location.

In a second exemplary embodiment, (1) the first camera and the second camera are one and the same, and (2) the controller is a finite state machine with the states: state 1 and state 2.

In another exemplary embodiment, (1) the first camera and the second camera are distinct; (2) the controller generally uses a translation vector that is based on the location of a detected face and a predetermined face location. The predetermined face location may be initialized at the power on of the view friendly monitor system if needed, for example if a new user is noticeably different in height than the previous user; and (3) the controller, in addition to face detection, performs face recognition as well. It has an individualized predetermined face location for each recognizable face. Face recognition feature eliminates the need to initialize the predetermined face location for recognizable faces.

In another application, the first camera produces a view and sends it to the controller. The second camera also produces an image and sends it to the controller.

At the start-up, the controller selects a cROI that is the ROSI and displays it on the monitor. Subsequently, the controller performs the following operations: 1) the controller does face detection on the received image from the second camera, 2) if a face is not detected, then the controller selects a current cROI, and it displays it. Next it repeats it for a next view. 3) But, if a face is detected, then the controller generates the location (x, y) of the detected face, where the image of the second camera has ph horizontal pixels and pv vertical pixels, and (x, y) is measured from the lower left corner of the image, and it corresponds to a certain point in the face. Next, the controller calculates the relative location of the detected face with respect to a transitory head location (ui, wi), obtaining Ti, where Ti=(x−ui, y−wi), where again (ui, wi) is measured from the lower left corner of the image of the second camera. 4) If the magnitude of Ti is not greater than dx, then the controller selects the current cROI, and it displays it. Next it repeats the operations for a next view. The magnitude of Ti is the square root of the sum of the squares of its coordinates, i.q., the square root of $(x-ui)^2+(y-wi)^2$. But if the magnitude of Ti is greater that dx, then the controller performs the following operations: It selects a cROI according to a preset rule; the preset rule may be to select a region of the view that is a translation of the current region of view. The translation may be generally toward the right side if the viewer's head moves generally toward the left side, and the translation may be generally toward the left side if the viewer's head moves generally toward the right side. Next, the controller displays the selected region of the view, cROI. Then the controller updates the transitory head location to be the viewer's current head location. Finally, the controller repeats the process for a next view.

Therefore, if the viewer wants to see a region of interest toward the right side of a displayed region of a view, she moves her head generally toward the left side. If her head movement is sufficient to produce a Ti having a magnitude greater than dx, then the controller would select a region of the view toward the right side of the displayed region of the view and the controller would display the selected region.

Similarly, if the viewer wants to see a region of interest toward the left side of a displayed region of a view, she moves her head generally toward the right side. If her head movement is sufficient to produce a Ti having a magnitude greater than dx, then the controller would select a region of the view toward the left side of the displayed region of the view and the controller would display the selected region.

In this application, the first transitory head location may be selected to be the viewer's head location the first time the head is detected.

In one variation, a view friendly monitor system using a transitory head location, in the event the magnitude of Ti is greater than dx and a translation of the current cROI places parts of the cROI outside the view area, does not translate the current cROI but updates the transitory head location. An advantage of this variation is that if the transitory head location causes unnecessary head movements, then the transitory head location updates reduce the unnecessary head motions.

In another variation, a view friendly monitor system responds to viewer's head motions toward right by translation of cROI toward right and responds to viewer's head motions toward left by translation of cROI toward left. Some drivers would prefer this response over the earlier response where motions toward right are responded by translations toward right and motions toward left are responded by translations toward left.

In yet another variation, a driver selects whether in a view friendly monitor system, head movements to translation directions be generally agreeing or opposing. The driver's selection may be made by selecting a position of a switch or by more advanced data entry methods.

An advantage of using a transitory head location compare to using a predetermined head location is: A view friendly monitor system is more robust when using a transitory head location than when using a predetermined head location with respect to variations in the size, height, sitting position of drivers, since when using a predetermined head position, all displayed regions are related to the predetermined head location. Generally, this is not the case when using a transitory head location since the transitory head location is updated every time the magnitude of, Ti, exceeds dx. Hence it is generally independent of a fixed initial position. Therefore, a view friendly monitor system requires less calibration when using a transitory head location than when using a predetermined head location.

Embodiments of the present invention provide a view friendly monitor system comprising an image source operable to produce a sequence of views; a camera operable to produce a sequence of images; and a controller operable to receive the sequence of views from the image source and the sequence of images from the camera, the controller further operable to detect a face in the sequence of images from the camera and to find a relative distance of a detected face from a predetermined face location; wherein the controller selects a selected region in the view of the image source based on the relative distance.

Embodiments of the present invention further provide a view friendly monitor system comprising an image source operable to produce a sequence of views; a camera operable to produce a sequence of images; and a controller operable to receive the sequence of views from the image source and the sequence of images from the camera, the controller having two states: a state 1 and a state 2, the controller further operable to detect a face in the sequence of images and to find a relative distance of a detected face from the state 1, wherein the controller selects a selected region in the view of the image source based on the relative distance; and the controller updates state 1, making it the location of the detected face.

Embodiments of the present invention also provide a method for providing a view friendly monitor to a driver of a vehicle comprising producing a sequence of views with a first camera, the sequence of views including at least a portion of an environment exterior to the vehicle; producing a sequence of images by a second camera; receiving the sequence of views from the first camera and the sequence of images from the second camera into a controller; detecting, by the controller, a face of the driver in the sequence of images from the second camera and determining a relative distance of a detected face from a predetermined face location; selecting, by the controller, a selected region in the view of the first camera based on the relative distance; and displaying the selected region on a monitor to the driver.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

FIG. 3A illustrates a boy looking into a pseudo mirror monitor;

FIG. 3B illustrates a camera view, a region of general interest and a region of special interest;

FIG. 3C illustrates a boy looking into a pseudo mirror monitor, with his head moved left;

FIG. 3D illustrates a boy looking into a pseudo mirror monitor, with his head moved right;

FIG. 3E illustrates a boy looking into a pseudo mirror monitor, with his head moved up;

FIG. 3F illustrates a boy looking into a pseudo mirror monitor, with his head moved down;

Figure 1A:
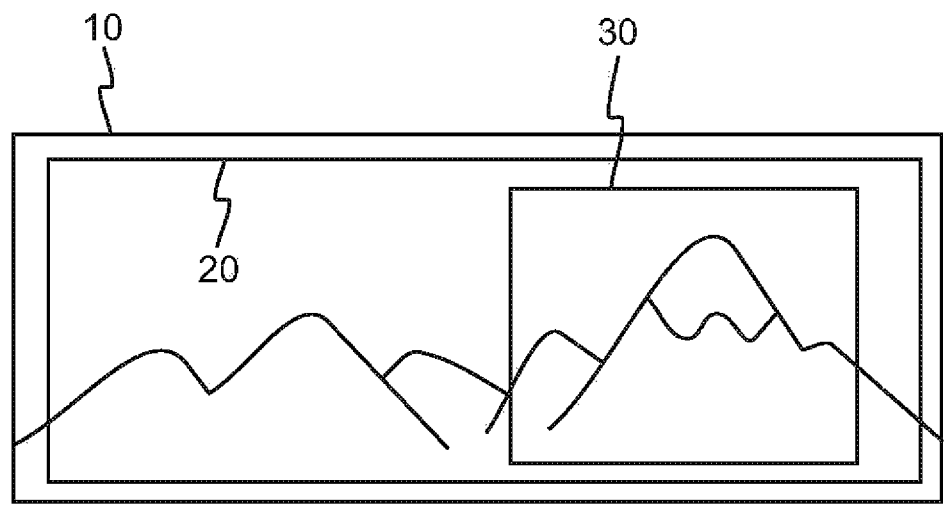
FIG. 1A illustrates a view, a region of general interest, and a region of special interest.
Figure 1B:
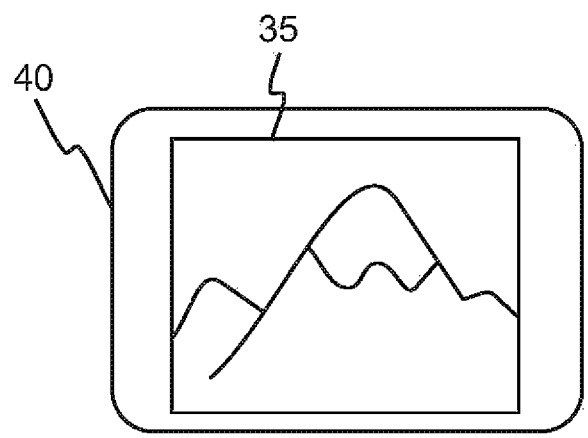
FIG. 1B illustrates a monitor with its display.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary, a variety of optional components are described to illustrate the wide variety of possible embodiments of the present invention.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a view friendly monitor system having a monitor and a sequence of views that are regions of interest. The sequence of views is captured by a first camera. The monitor can display a region of the camera view; the system is configured such that the displayed region of the camera view is a region of interest to the user. The displayed portion of the camera view changes to match the changing interests of the user. For example, a user that is interested to see a view in a direction beyond a certain edge of the monitor would move her head generally in an opposite direction. To see farther outside the edge, she needs to move her head farther in the opposite direction. In another example, a user that is interested to see a view in a direction beyond a certain edge of the monitor would move her head generally in the same direction. To see farther outside the edge, she needs to move her head farther in the same direction.

In response to her head movement, the view friendly monitor system would change the region of interest based on the direction and the length of her head movement, then the system would display the new region of interest on the monitor. A second camera in the system captures a sequence of images that generally include the user; the system performs face detection on the sequence of images of the second camera. The system uses changes in the location of a detected face to adapt to the changes in the viewing interest of the user.

The present invention is described using various examples. Each example describes various situations and embodiments where the system of the present invention may be applied. The examples are used to describe specific incidents in which the present invention may be useful but is not meant to limit the present invention to such examples.

Example 1

Example 1 is explained using FIGS. 2A through 2C and FIGS. 5 through 7.

This example relates to inside vehicle monitors. More specifically, the view friendly monitor system of Example 1 enables easy access to areas of a view not displayed on a monitor, especially views just outside the periphery of the displayed view.

Figure 5:
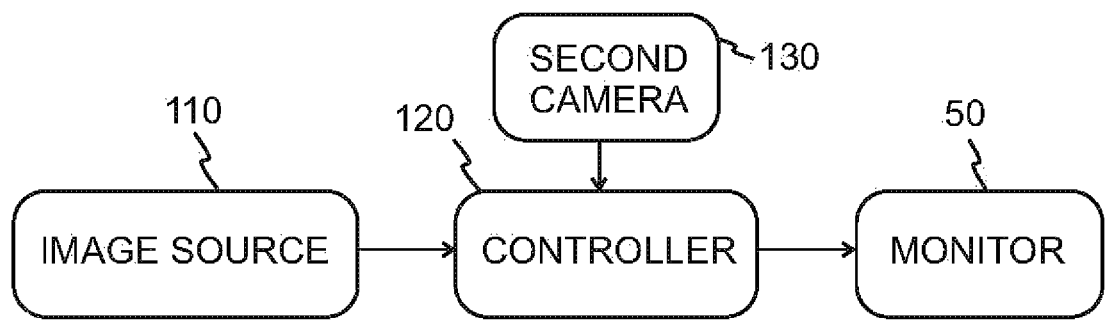
FIG. 5 illustrates a block diagram of a system according to a first exemplary embodiment of the present invention.

FIG. 5 provides a block diagram of the view friendly monitor system of Example 1. The view friendly monitor system of Example 1 includes an image source 110, a controller 120, a second camera 130, and the monitor 50.

Figure 2A:
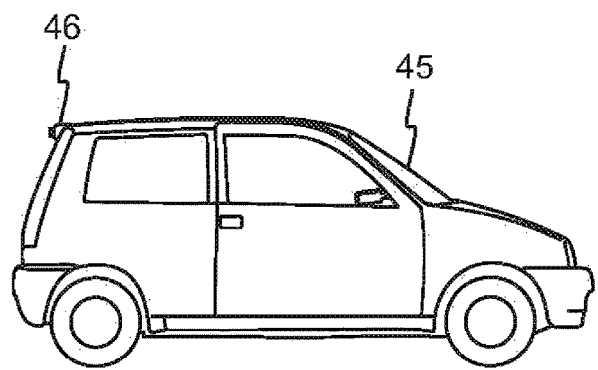
FIG. 2A illustrates an automobile with a rear side camera.

The image source 110 is the camera 46 of FIG. 2A.

The camera 46 produces f views per second. The view 70 produced by the camera 46 contains the ROGI 80 that in turn contains the ROSI 85 as shown in FIG. 2C.

The controller 120 receives the views from the camera 46 at a rate of f views per second.

The monitor 50 displays images it receives from the controller 120.

The second camera 130 is configured to send images to the controller 120. The second camera 130 may be placed above the monitor 50 as in FIG. 6.

For clarity, the camera 46 will be referred to as the first camera 46 from here on. It is apparent that the first camera 46 and the second camera 130 are distinct.

Figure 7:
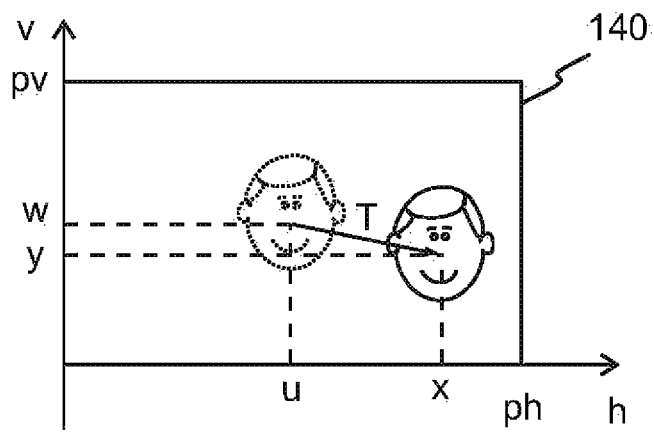
FIG. 7 illustrates a view of the second camera and a relative location of a detected face with respect to a predetermined face location.

Functionally, the first camera 46, as seen in FIG. 2A, produces the view 70, as seen in FIG. 2C, and sends it to the controller 120, as seen in FIG. 5. The second camera 130 also produces an image 140, as seen in FIG. 7, and sends it to the controller 120.

The controller 120 performs the following operations: The controller 120 does face detection on the received image 140 from the second camera 130.

If a face is not detected, then the controller 120 displays the ROSI 85 on the monitor 50. But, if a face is detected, then (1) the controller 120 generates the location (x, y) of the detected face, where the image 140 of the second camera 130 has ph horizontal pixels and pv vertical pixels. The location (x, y) is measured from the lower left corner of the image 140 and it corresponds to a certain point in the face. (2) Referring to FIG. 7, next, the controller 120 calculates the relative location of the detected face with respect to a predetermined face location (u, w), obtaining T=(x−u, y−w), where again (u, w) is measured from the lower left corner of the image 140 of the second camera 130. (3) The controller 120 computes a translation vector, (−1)*alpha*T, where alpha is a non-negative constant, and the controller 120 generates a current region of interest cROI 86 in the ROGI 80 of the first camera 46 by translating the ROSI 85 by the translation vector.

If the translation vector moves pixels of the cROI 86 outside the ROGI 80, then the controller 120 stops the move beyond the edges of the ROGI 80. In this case, the move can be described as saturated.

Finally, the controller 120 displays the cROI 86 on the monitor 50.

Hence the region of interest cROI 86 is congruent to the ROSI 85 and the translation vector, (−1)*alpha*T, in general, is proportional to the head movement (T) with respect to the predetermined face location (u, w). A first example of a predetermined location is a location, (u, w), stored in the system. A second example of a predetermined location is when a user's face or head is detected and its location, (u, w), is used for the location of the predetermined location. A third example of a predetermined location is when a user's face or head is detected and its location averaged over an interval to determine the location, (u, w).

Figure 2B:
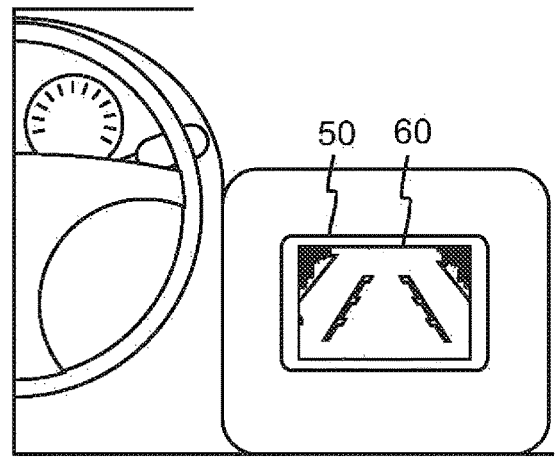
FIG. 2B illustrates an inside vehicle monitor.
Figure 2C:
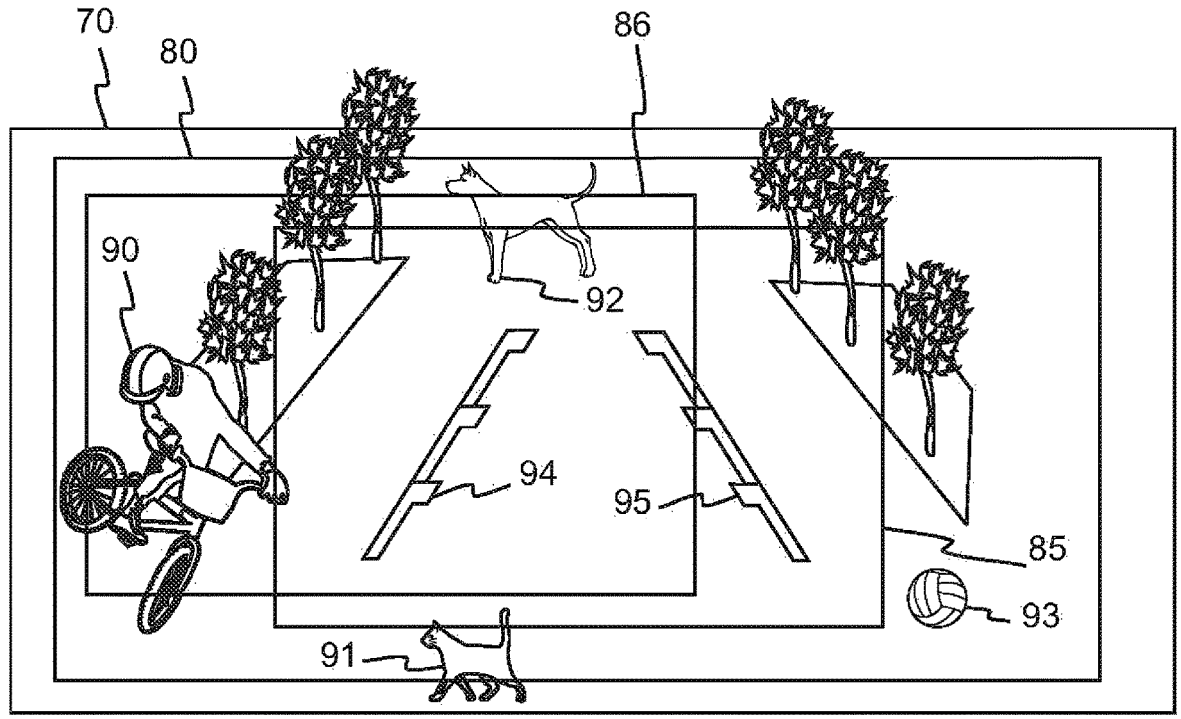
FIG. 2C illustrates a busy driveway.

Referring to FIG. 2A, FIG. 2B and FIG. 2C, the driver of the automobile 45 sees the ROSI 85 displayed on the monitor 50. If he becomes curious about what seems to be animal legs on the top edge of the display 50 and someone's hand on the left edge of the display 50, then he would move his head downward and toward the right, as shown in FIG. 7. The controller 120 would detect this shift of the head through images it receives from the second camera 130 and the controller 120 would select a cROI 86 that is higher than the ROSI 85 and is to the left of the ROSI 85. The selected cROI 86 would reveal more of the dog 92 and the bicyclist 90. Then, the controller 120 would show the cROI 86 on the display 60 of the monitor 50.

Similarly, the driver may inspect other peripheral views. Upon inspection of the other peripheral views, the driver would discover the ball 93 and the cat 91.

Thus, the view friendly monitor of Example 1 enables easy access to areas of a view just outside the view displayed on a monitor.

Example A

Example A is explained using FIGS. 6, 7, 16 through 18. This example also relates to inside vehicle monitors. More specifically, the view friendly monitor system of Example A enables easy access to areas of a view not displayed on a monitor, especially views outside the periphery of the displayed view. Even more specially, in order to survey a larger view or a larger field of view, a view is generated that is a union of views produced by distinct cameras or by distinct image sources.

Figure 16:
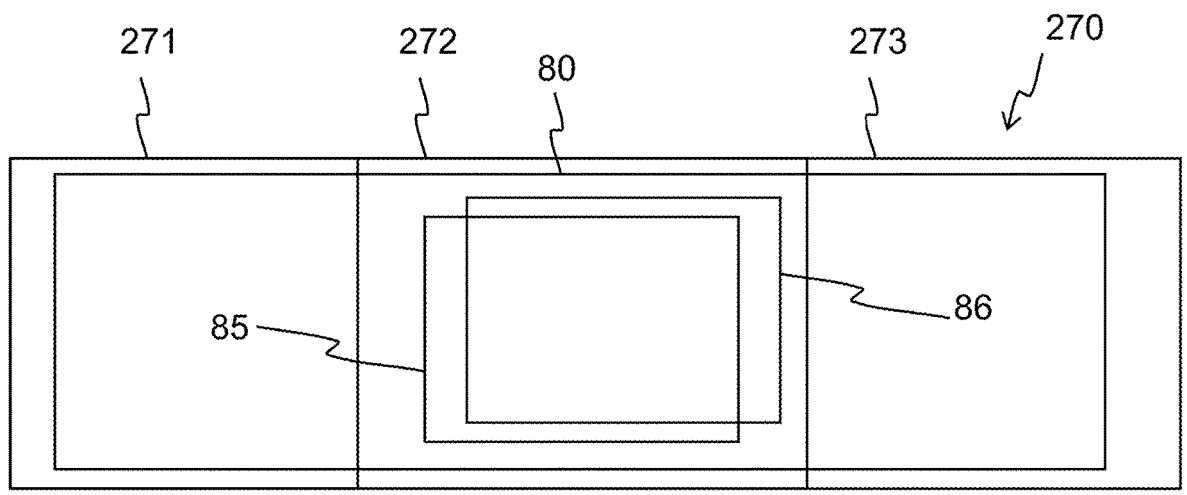
FIG. 16 illustrates a camera view, a region of general interest and a region of special interest.
Figure 17:
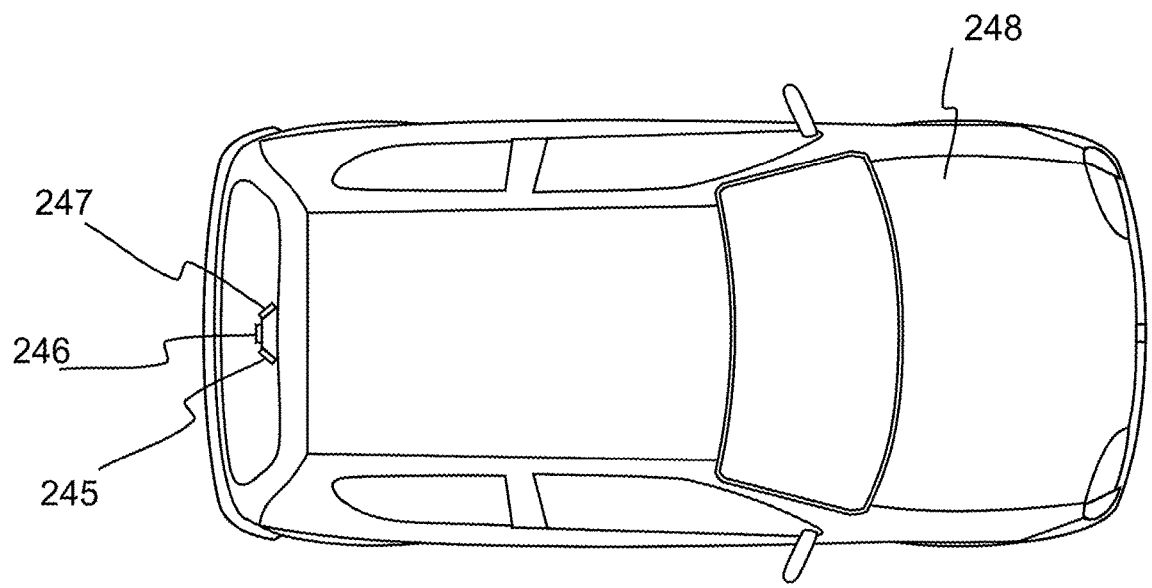
FIG. 17 illustrates a vehicle having multiple image sources according to an exemplary embodiment of the present invention.
Figure 18:
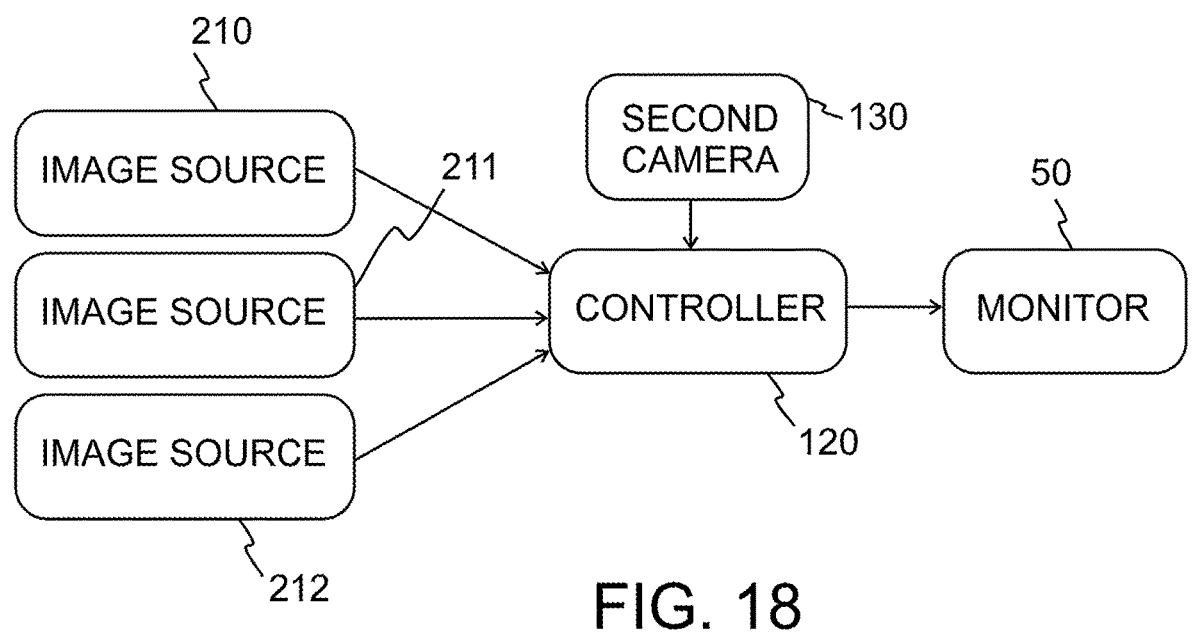
FIG. 18 illustrates a block diagram of a view friendly monitor system according to an exemplary embodiment of the present invention.

FIG. 18 provides a block diagram of the view friendly monitor system of Example A. The view friendly monitor system of Example A includes image sources 210, 211 and 212, a controller 120, a second camera 130, and the monitor 50. The image source 210 is a camera 246 of FIG. 17. The image source 211 is a camera 245 of FIG. 17. The image source 212 is a camera 247 of FIG. 17. The cameras 245, 246 and 247 produce views 271, 272 and 273, respectively, as shown in FIG. 16. A view 270 produced by the views 271, 272 and 273 contains the ROGI 80, which is shown as horizontally long rectangle that extends into all the views 271, 272 and 273. The ROGI 80 in turn contains the ROSI 85.

The controller 120 receives the views from the cameras 245, 246 and 247 at a rate of f views per second. The monitor 50 displays images received from the controller 120.

The second camera 130 is configured to send images to the controller 120. The second camera 130 may be placed above the monitor 50 as in FIG. 6. For clarity, the camera 245, 246 and 247 will be referred to as the first cameras 245, 246 and 247 from here on. It is apparent that the first cameras 245, 246 and 247 are distinct from the second camera 130.

Functionally, the first camera 245, as seen in FIG. 17, produces the view 271, as seen in FIG. 16, and sends it to the controller 120, as seen in FIG. 18. The first camera 246, as seen in FIG. 17, produces the view 272, as seen in FIG. 16, and sends it to the controller 120, as seen in FIG. 18. The first camera 247, as seen in FIG. 17, produces the view 273, as seen in FIG. 16, and sends it to the controller 120, as seen in FIG. 18. The second camera 130 also produces an image 140, as seen in FIG. 7, and sends it to the controller 120.

The controller 120 performs the following operations:

(1) The controller 120 performs face detection on the received image 140 from the second camera 130. If a face is not detected, then the controller 120 displays the ROSI 85 on the monitor 50. But, if a face is detected, then (1) the controller 120 generates the location (x, y) of the detected face, where the image 140 of the second camera 130 has ph horizontal pixels and pv vertical pixels. The location (x, y) is measured from the lower left corner of the image 140 and it corresponds to a certain point in the face.

(2) Referring to FIG. 7, next, the controller 120 calculates the relative location of the detected face with respect to a predetermined face location (u, w), obtaining T=(x−u, y−w), where again (u, w) is measured from the lower left corner of the image 140 of the second camera 130.

(3) The controller 120 computes a translation vector, V, function of (x−u) and (y−w), generally negatively proportional to T, and the controller 120 generates a current region of interest cROI 86 in the ROGI 80 of the first cameras 245, 246 and 247 by translating the ROSI 85 by the translation vector V.

If the translation vector moves pixels of the cROI 86 outside the ROGI 80, then the controller 120 stops the move beyond the edges of the ROGI 80. In this case, the move can be described as saturated. Also, if the translation vector causes the cROI 86 to intersect both the view 271 and the view 272, then the controller 120 may adjust the position of the cROI 86 to fall entirely in the view 271 or the view 272 based on a predetermined rule. One such rule may be to push the cROI 86 to just inside the view 271 if the cROI 86 intersects the view 271 and 272. Similarly, if the translation vector causes the cROI 86 to intersect both the view 272 and the view 273, then the controller 120 may adjust the position of the cROI 86 to fall entirely in the view 272 or the view 273 based on a predetermined rule.

Finally, the controller 120 displays the cROI 86 on the monitor 50.

Hence the region of interest cROI 86 is congruent to the ROSI 85 and the translation vector, V, in general, is negatively proportional (but not uniformly) to the head movement (T) with respect to the predetermined face location (u, w). The controller 120 may choose the following function to generate, the translation vector, V. Let W=(−1)*alpha*T, then: V=q1 W, if W intersects the views 271 and 272, where q1 is selected such that V is just inside the view 271, V=q2 W, if W intersects the views 272 and 273, where q2 is selected such that V is just inside the view 273, and V=W otherwise.

Referring to FIG. 17, the driver of an automobile 248 sees the ROSI 85 displayed on the monitor 50. To survey areas in the view 272, which is the scope of the camera 246, he would move his head as he would survey in a mirror. To survey areas in the views 271 and 273, which are the scopes of the cameras 245 and 247, respectively, he would move his head farther in the right and left directions.

Thus, the view friendly monitor of Example A enables easy access to areas of a view outside the view displayed on a monitor.

Example 2

Example 2 is explained using FIGS. 3A through 3F, 8 and 9.

This example relates to pseudo mirror monitors. More specifically, the view friendly monitor system of Example 2 enables monitors to offer a more "mirror type" experience to the users.

Figure 8:
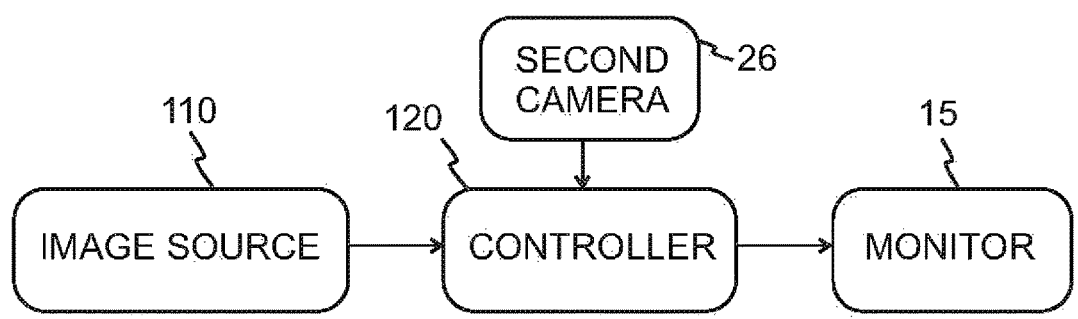
FIG. 8 illustrates a block diagram of a system according to a second exemplary embodiment of the present invention.

FIG. 8 provides a block diagram of the view friendly monitor system of Example 2. The view friendly monitor system of Example 2 includes an image source 110, a controller 120, a second camera 26, and the monitor 15.

The image source 110 is the camera 25 of FIG. 3A.

The camera 25 produces f views per second. The view 6 produced by the camera 25 contains the ROGI 7 that in turn contains the ROSI 8 as shown in FIG. 3B.

The controller 120 receives the views from the camera 25 at a rate of f views per second.

The monitor 15 displays images it receives from the controller 120.

In Example 2, the camera 25 and the second camera 26 are one and the same.

Functionally, the camera 25 produces the view 6 and sends it to the controller 120. The controller 120 displays on the monitor 15 a current region of interest cROI that is a translation of the ROSI 8.

The controller 120 runs as a finite state machine having two states: a state 1 and a state 2. The state 1=(a, b), where (a, b) is the location of a detected face in the previous view from the camera 25, or it is (u, w) if no face was detected in the previous view, where (u, w) is a predetermined face location. The state 2 is the location of the cROI in the previous view of the camera 25.

Once the controller 120 is properly initialized, the controller performs the following operations: The controller 120 does face detection on the received view 6 from the camera 25. If a face is not detected, then the controller displays the ROSI 8 on the monitor 15. But, if a face is detected, then (1) the controller 120 generates the location (x, y) of the detected face, where the image of the camera 25 has ph horizontal pixels and pv vertical pixels, and (x, y) is measured from the lower left corner of the image, and it corresponds to a certain point in the face. (2) Next, the controller 120 calculates the relative location of the detected face with respect to the state 1=(a, b), obtaining T=(x−a, y−b). (3) The controller 120 computes a translation vector which equals (−1)*alpha*T, where alpha is a non-negative constant, and the controller 120 generates a current region of interest cROI in the view of the camera 25 by translating the state 2 by the translation vector. (4) Then, the controller 120 displays the cROI on the monitor 15. (5) Finally, the controller 120 updates the state 1=(x, y), and updates the state 2 to be the location of the current cROI.

Hence the region of interest, cROI, is congruent to the state 2 and the translation vector, (−1)*alpha*T, is proportional to the head movement from the previous image of the camera 25 to the current image of the image of the camera 25 (T). The current image of the camera 25 is the current view 7.

Referring to FIG. 3A and FIG. 3B, the boy 9 sees the ROSI 8 displayed on the monitor 15. If the boy 9 desires to see beyond the right edge of the monitor 15, then he moves his head toward the left as shown in FIG. 9A.

The controller 120 would detect this shift of the head through the images it receives from the camera 25, and the controller 120 would select a cROI that is to the right of the ROSI 8.

Figures 9A, 9B, 9C, 9D:
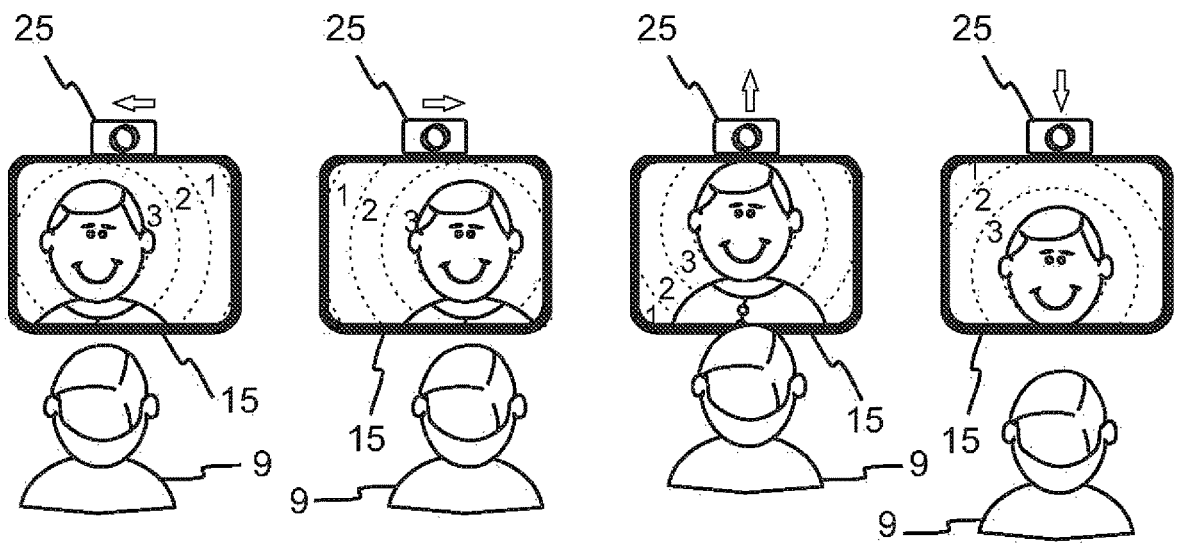
FIG. 9A illustrates a boy looking into a view friendly monitor, with his head moved left.
FIG. 9B illustrates a boy looking into a view friendly monitor, with his head moved right.
FIG. 9C illustrates a boy looking into a view friendly monitor, with his head moved up.
FIG. 9D illustrates a boy looking into a view friendly monitor, with his head moved down.

The selected cROI of FIG. 9A would reveal more of the background of the boy 9 toward the right side and the controller 120 would display the cROI on the monitor 15. It is noted that the ring 1 is more revealed on the right side.

Similarly, the boy would be able to see more of the background in any given direction. The left, down and top directions of movement are shown in FIG. 9B, FIG. 9C and FIG. 9D, respectively.

Thus, the view friendly monitor of Example 2 enables monitors to offer a more "mirror type" experience to the users.

Example 3

Example 3 is explained using FIGS. 4A, 4B, 7 and 10 through 13B.

This example relates to vehicle side monitors. More specifically, the view friendly monitor system of Example 3 enables easy access to areas of a view at the outside periphery of a displayed view.

Figure 10:
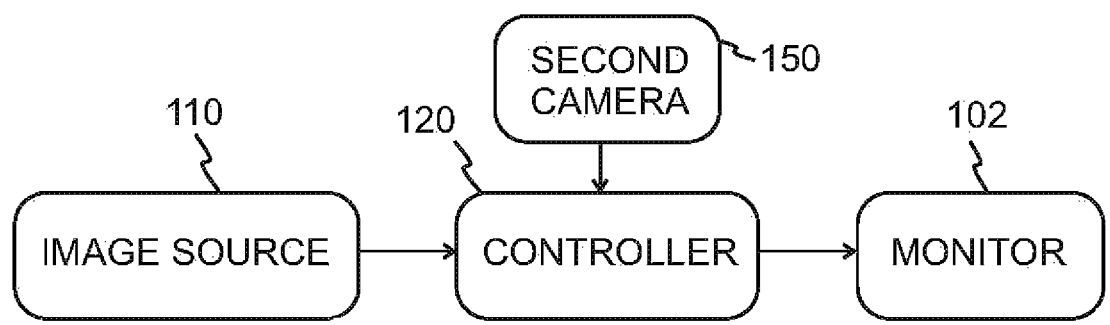
FIG. 10 illustrates a block diagram of a system according to a third exemplary embodiment of the present invention.

FIG. 10 gives a block diagram of the view friendly monitor system of Example 3. The view friendly monitor system of Example 3 includes an image source 110, a controller 120, a second camera 150, and the monitor 102.

Figure 4A:
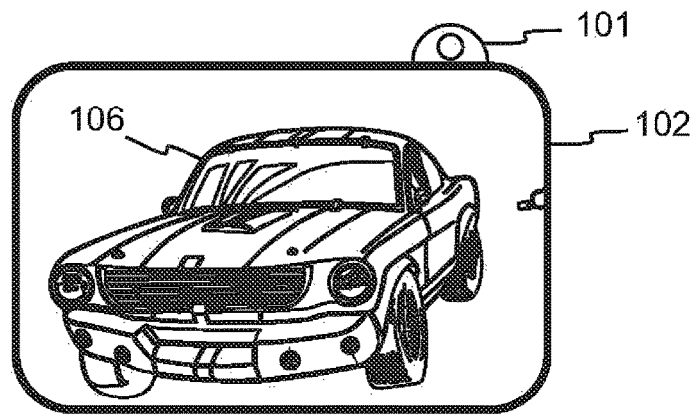
FIG. 4A illustrates a vehicle side monitor.

The image source 110 is the camera 101 of FIG. 4A.

Figure 4B:
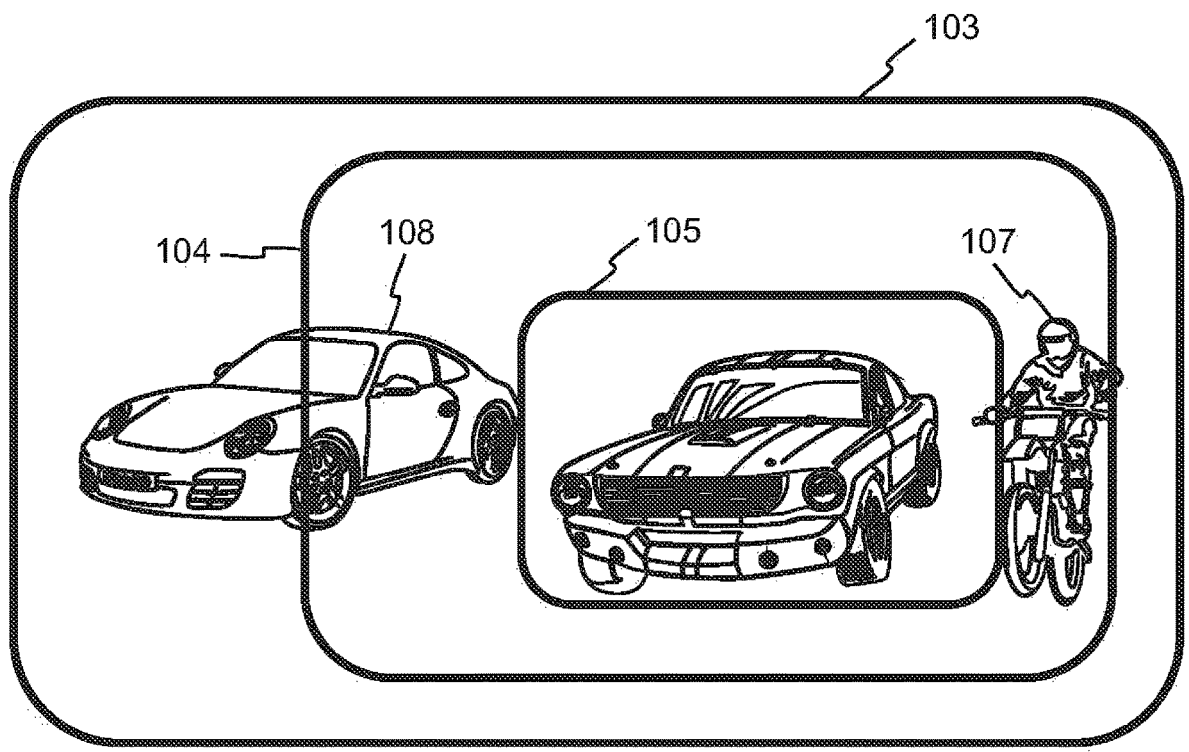
FIG. 4B illustrates a camera view, a region of general interest and a region of special interest.

The camera 101 produces f views per second. The view 103 produced by the camera 101 contains the ROGI 104 that in turn contains the ROSI 105 as shown in FIG. 4B.

The controller 120 receives the views from the camera 101 at a rate of f views per second.

The monitor 102 displays images it receives from the controller 120.

Figure 11:
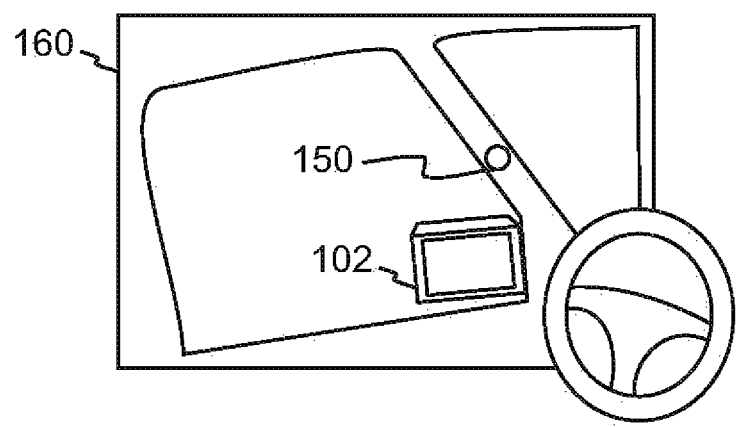
FIG. 11 illustrates a second camera inside a vehicle, for a vehicle side monitor.

The second camera 150 is configured to send images to the controller 120. The second camera 150 may be placed close to the monitor 102 but inside the vehicle 160 as shown in FIG. 11.

For clarity, the camera 101 will be referred to as the first camera 101 from here on. Again, it is apparent that the first camera 101 and the second camera 150 are distinct.

Functionally, the first camera 101 produces the view 103 and sends it to the controller 120. The second camera 150 also produces an image 140 and sends it to the controller 120. FIG. 7 is used to describe the image of the camera 130 as well as the image of the camera 150.

The controller 120 performs the following operations: The controller 120 does face detection on the received image 140 from the second camera 150. In addition, the controller 120 does face recognition on detected faces. For each of its recognizable faces, the controller 120 has an individualized predetermined face location. For the rest of the detected faces, the controller 120 uses a generic predetermined face location.

If a face is not detected, then the controller 120 displays the ROSI 105, as shown in FIG. 4B, on the monitor 102. If a face is both detected and recognized, then the controller 120 selects the corresponding predetermined face location, but if a face is detected but not recognized then the controller 120 selects the generic predetermined face location.

Then, (1) the controller 120 generates the location (x, y) of the detected face, where the image 140 of the second camera 150 has ph horizontal pixels and pv vertical pixels. The location (x, y) is measured from the lower left corner of the image 140 and it corresponds to a certain point in the face. (2) Referring to FIG. 7, next, the controller 120 calculates the relative location of the detected face with respect to the selected predetermined face location (u, w), obtaining T=(x−u, y−w), where again (u, w) is measured from the lower left corner of the image 140 of the second camera 150. (3) The controller 120 computes a translation vector, (−1)*alpha*T, where alpha is a non-negative scalar, and the controller 120 generates a current region of interest cROI in the ROGI 104 of the first camera 101 by translating the ROSI 105 by the translation vector. If the translation vector moves pixels of the cROI outside the ROGI 104, then the controller 120 stops the move beyond the edges of the ROGI 104. In this case, the move is referred to as being saturated. (4) Finally, the controller 120 displays the cROI on the monitor 102.

Hence the region of interest cROI is congruent to the ROSI 105 and the translation vector, (−1)*alpha*T, in general is proportional to the head movement (T). Again, a first example of a predetermined location is a location, (u, w), stored in the system. A second example of a predetermined location is when a user's face or head is detected and its location, (u, w), is used for the location of the predetermined location. A third example of a predetermined location is when a user's face or head is detected and its location averaged over an interval to determine the location, (u, w).

Figure 12A:
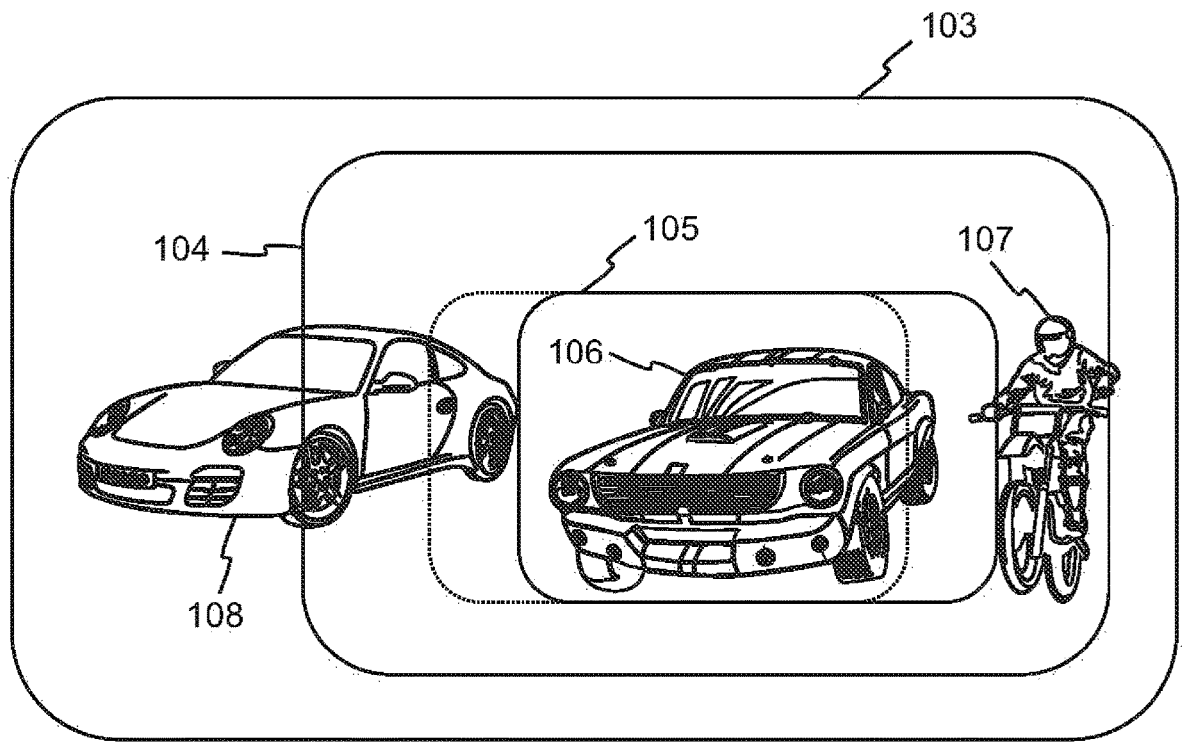
FIG. 12A illustrates a camera view, a region of general interest and a region of special interest.
Figure 12B:
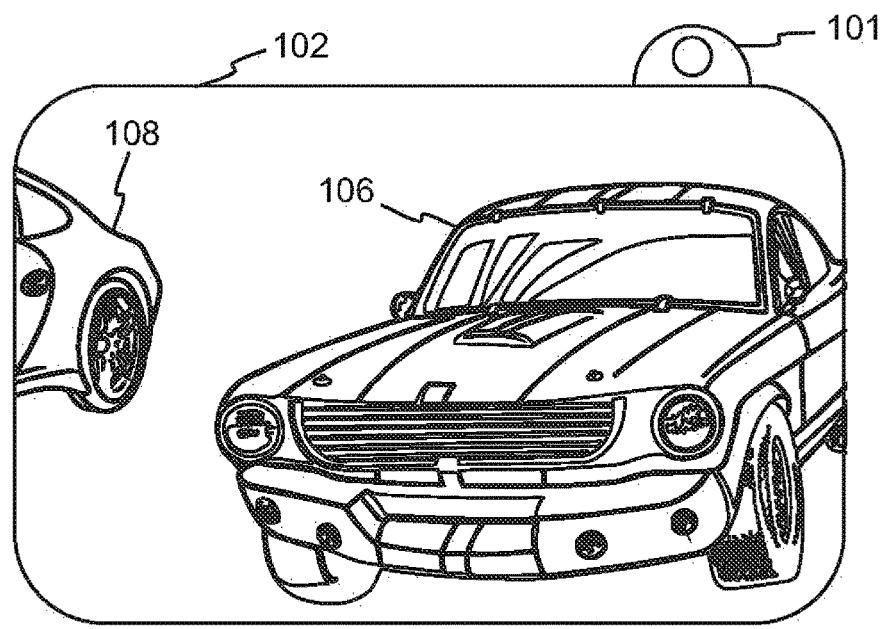
FIG. 12B illustrates a view friendly monitor.

Referring to FIG. 12A and FIG. 12B, the driver of the vehicle 160 sees the ROSI 105 displayed on the monitor 102. If the driver desires to survey the view to the left of the ROSI 105, then he would move his head toward the right. The controller 120 would detect this shift of the head through images it receives from the second camera 150 and the controller 120 would select a cROI that is to the left of the ROSI 105. In this case, the cROI is shown in FIG. 12A by dotted outline.

The selected cROI, as shown in FIG. 12A, reveals part of the rear portion of the car 108. Then, the controller 120 would display the cROI on the monitor 102, as shown in FIG. 12B.

Figure 13A:
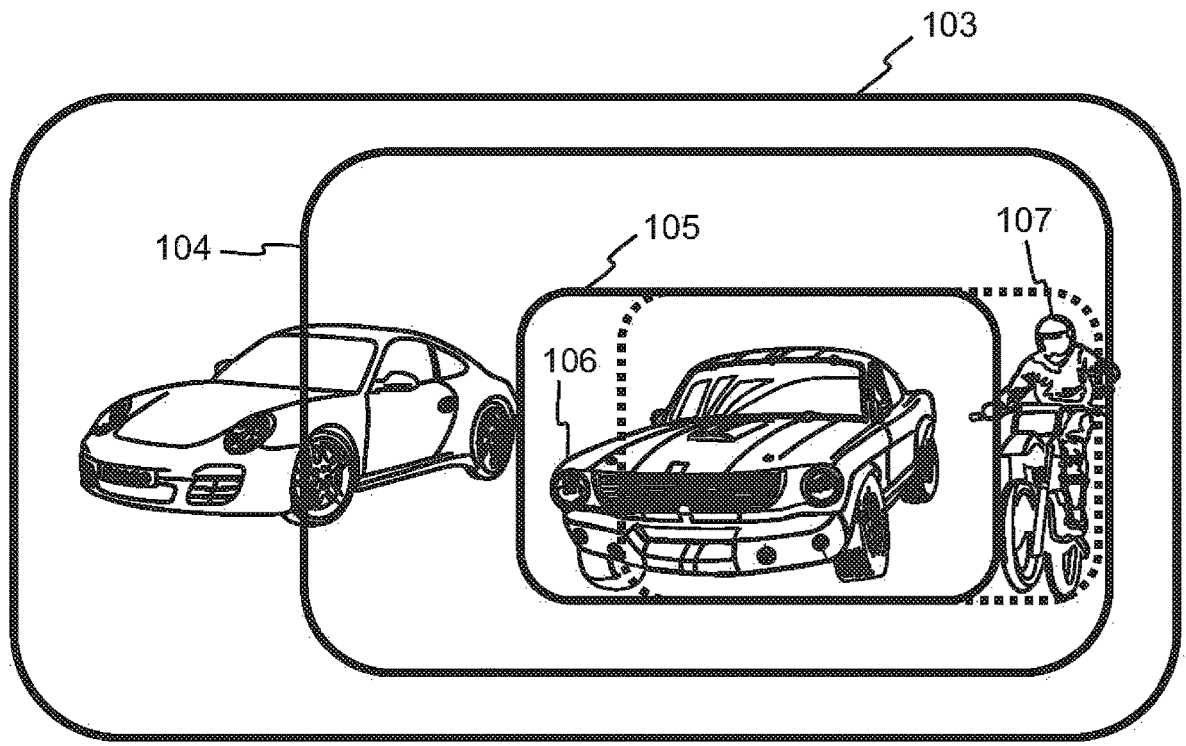
FIG. 13A illustrates a camera view, a region of general interest and a region of special interest.
Figure 13B:
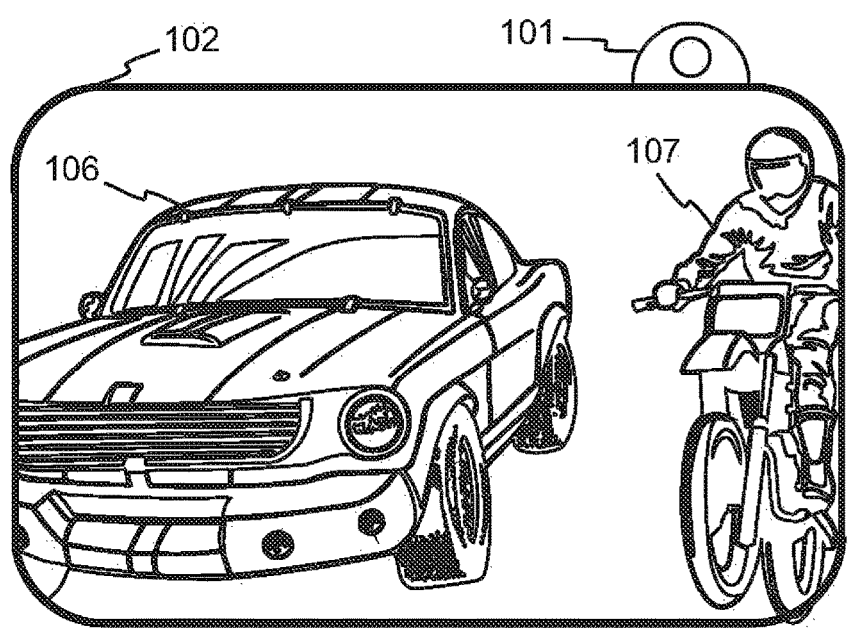
FIG. 13B illustrates a view friendly monitor.

Referring to FIG. 13A and FIG. 13B, the driver of the vehicle 160 sees the ROSI 105 displayed on the monitor 102. If the driver desires to survey the view to the right of the ROSI 105, then he would move his head toward the left. The controller 120 would detect this shift of the head through images it receives from the second camera 150 and the controller 120 would select a cROI that is to the right of the ROSI 105. Again, the cROI is shown in FIG. 13A by dotted outline.

The selected cROI, as shown in FIG. 13A, reveals the motorcyclist 107. Then, the controller 120 would display the cROI on the monitor 102, as shown in FIG. 13B.

Similarly, the driver may inspect other peripheral views.

Thus, the view friendly monitor of the Example 3 enables easy access to areas of a view just outside the view displayed on a monitor.

In all the examples above, the ROGI may be selected to be the whole image or a proper subset of the whole image.

Example 4

Figure 14:
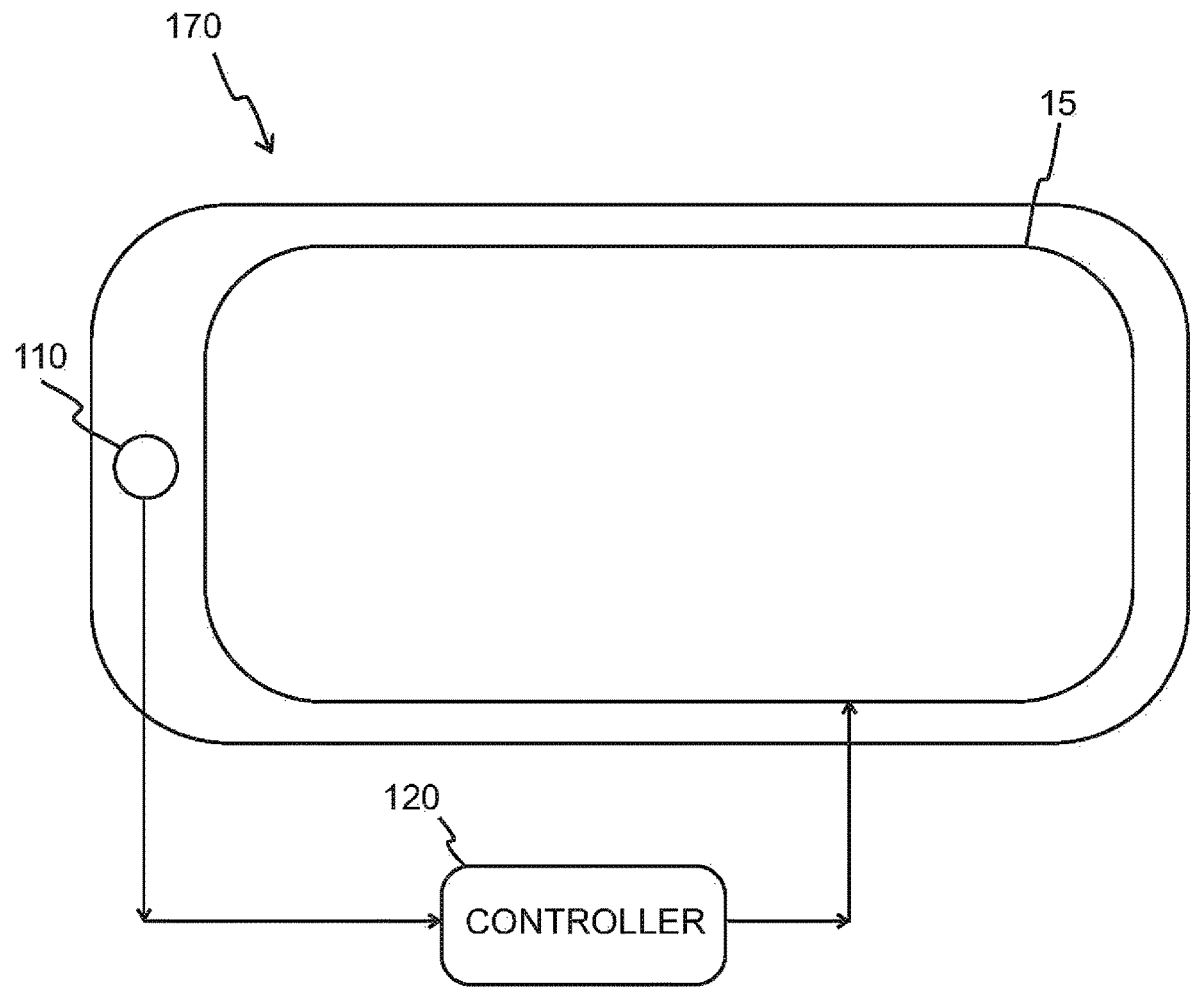
FIG. 14 illustrates a smartphone according to a fourth exemplary embodiment of the present invention.
Figure 15:
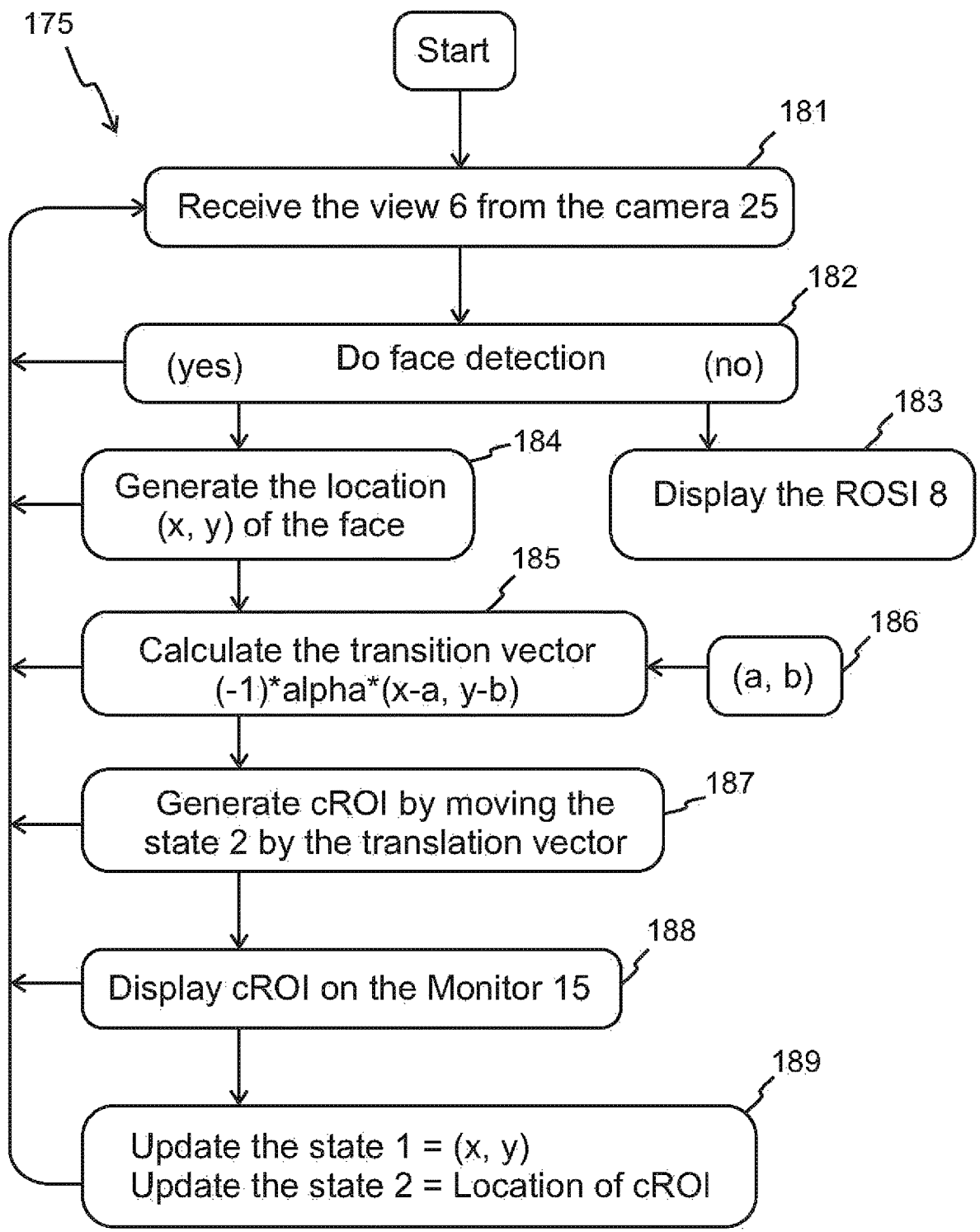
FIG. 15 illustrates a flow chart describing a method for generating an image on the smartphone of FIG. 14.

Example 4 is explained using FIG. 3, FIG. 14 and FIG. 15.

Smartphones provide a good hardware environment to implement Examples 1-3 because generally they possess controllers, monitors and cameras. In Example 4, a smartphone is used to implement the pseudo mirror monitors of Example 3.

FIG. 14 illustrates the view friendly monitor system of Example 4. The view friendly monitor system of Example 4 uses a smartphone 170 that includes the image source 110, the controller 120, and the monitor 15. The controller 120 actually resides inside the smartphone 170 and is drawn exterior to the smartphone to ease the description of Example 4.

The image source 110 is the camera 25 of FIG. 3A. The camera 25 produces f views per second. The view 6 produced by the camera 25 contains the ROGI 7 that in turn contains the ROSI 8, as shown in FIG. 3B.

The controller 120 receives the views from the camera 25 at a rate of f views per second.

The monitor 15 displays images it receives from the controller 120.

Functionally, the camera 25 produces the view 6 and sends it to the controller 120. The controller 120 displays on the monitor 15 a region of interest cROI that is a translation of the ROSI 8.

The controller 120 runs as a finite state machine having: the state 1 and the state 2. The state 1=(a, b), where (a, b) is the location of a detected face in the previous view from the camera 25, or it is (u, w) if no face was detected in the previous view, where (u, w) is a predetermined face location. The state 2 is the location of the cROI in the previous view of the camera 25.

Once the controller 120 is properly initialized, referring to a flow diagram 175 of FIG. 15, the controller 120 performs the following operations. The controller receives the view 6 from the camera 25, at step 181 of FIG. 15. Next, the controller performs face detection on the view 6, at step 182. If a face is not detected, then the controller displays the ROSI 8 on the monitor 15, at step 183. But, if a face is detected, then (1) the controller 120 generates the location (x, y) of the detected face, where the image of the camera 25 has ph horizontal pixels and pv vertical pixels, and (x, y) is measured from the lower left corner of the image, and it corresponds to a certain point in the face, as described at step 184. Next, the controller 120 computes the relative location of the detected face with respect to the state 1=(a, b) (a box 186), obtaining T=(x−a, y−b). The controller 120 calculates a translation vector=(−1)*alpha*T, where alpha is a non-negative constant, at step 185. Referring to step 187, the controller 120 generates a current region of interest cROI in the view of the camera 25 by translating the state 2 by the translation vector. Then, the controller 120 displays the cROI on the monitor 15, a box 188. The controller 120 updates the state 1=(x, y), and updates the state 2 to be the location of the current cROI, at step 189. Finally, the controller 120 processes the next view 6 from the camera 25.

Generally, a controller in a smartphone performs its tasks by following a computer program called an application, or app for short.

Referring to FIG. 3A and FIG. 3B, the boy 9 sees the ROSI 8 displayed on the monitor 15. If the boy 9 desires to see beyond the right edge of the monitor 15, then he moves his head toward the left, as shown in FIG. 9A.

The controller 120 would detect this shift of the head through the images it receives from the camera 25, and the controller 120 would select a cROI that is to the right of the ROSI 8.

The selected cROI, as shown in FIG. 9A, would reveal more of the background of the boy 9 toward the right side and the controller 120 would display the cROI on the monitor 15, as shown in FIG. 9A. It is noted that the ring 1 is more revealed on the right side.

Similarly, the boy would be able to see more of the background in any given direction. The left, down and top direction movements are shown in FIG. 9B, FIG. 9C and FIG. 9D, respectively.

Thus, using the hardware environment of smartphones, the view friendly monitor of the Example 4 enables monitors to offer a more "mirror type" experience to the users.

Example 5

Example 5 is explained using FIGS. 7, 10, 11, 19A-B and 20. This example relates to vehicle side monitors. More specifically, the view friendly monitor system of Example 5 enables easy access to areas of a view in a blind spot of a driver. FIG. 10 gives a block diagram of the view friendly monitor system of Example 5. The view friendly monitor system of Example 5 includes an image source 110, a controller 120, a second camera 150, and a monitor 102.

Figure 19A:
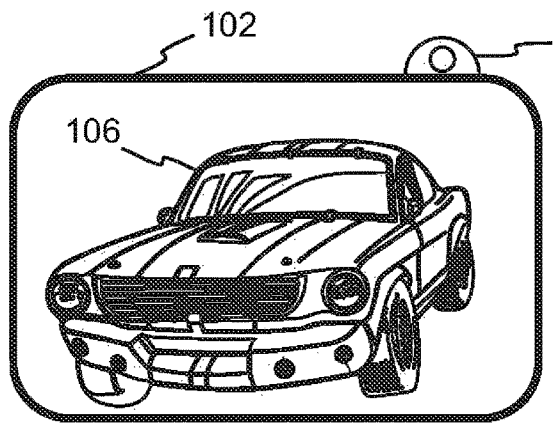
FIG. 19A illustrates a view friendly monitor showing a first ROSI.
Figure 19B:
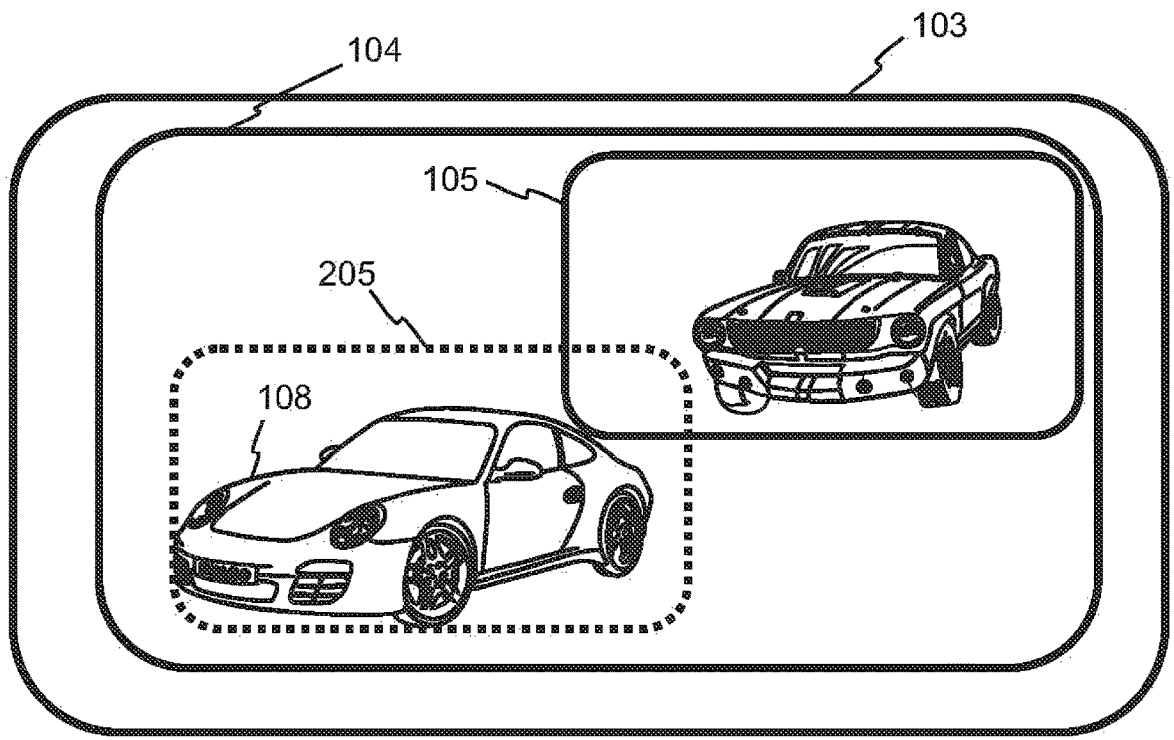
FIG. 19B illustrates a camera view, a region of general interest and two regions of special interest.

The image source 110 is the camera 101 of FIG. 19A. The camera 101 produces f views per second. As shown in FIG. 19B, the view 103 produced by the camera 101 contains a ROGI 104 that in turn contains two regions of special interest: a first ROSI 105 and a second ROSI 205. The controller 120 receives the views from the camera 101 at a rate of f views per second.

The first ROSI 105 corresponds to a region containing a traditional left side mirror view. The second ROSI 205 corresponds to a region containing a traditional view of a left side blind spot.

The monitor 102 displays images it receives from the controller 120. The second camera 150 is configured to send images to the controller 120. The second camera 150 may be placed close to the monitor 102 but inside the vehicle 160 as shown in FIG. 11. For clarity, the camera 101 will be referred to as the first camera 101 from here on. Again, it is apparent that the first camera 101 and the second camera 150 are distinct. Functionally, the first camera 101 produces the view 103 and sends it to the controller 120. The second camera 150 also produces an image 140 and sends it to the controller 120. FIG. 7 is used to describe the image of the camera 150.

The controller 120 performs the following operations: The controller 120 does face detection on the received image 140 from the second camera 150. If a face is not detected, then the controller 120 displays the first ROSI 105, as shown in FIG. 19B, on the monitor 102. If a face is detected, then, (1) the controller 120 generates the location (x, y) of the detected face, where the image 140 of the second camera 150 has ph horizontal pixels and pv vertical pixels. The location (x, y) is measured from the lower left corner of the image 140 and it corresponds to a certain point in the face. (2) Referring to FIG. 7, next, the controller 120 calculates the relative location of the detected face with respect to a transitory head location (ui, wi), obtaining Ti=(x−ui, y−wi), where again (ui, wi) is measured from the lower left corner of the image 140 of the second camera 150. (3) Next, one of the following two cases are processed depending on whether the current display on the monitor 102 is the first ROSI 105 or the second ROSI 205.

Case A) the Current Display on the Monitor 102 is the First ROSI 105:

If the magnitude of Ti, square root of $(x-ui)^2+(y-wi)^2$, is greater than a preset value, dx, and x−ui≤0, then for a next frame, the controller 120 changes the display of the monitor 102 to be the second ROSI 205, and the controller 120 updates the transitory head location to be, (x, y), the current head position. This condition of Case A) covers the situation when a driver moves her head sufficiently sideway toward the left side in order to view a blind spot.

If the magnitude of Ti is not greater than a preset value, dx, and x−ui≤0, then for a next frame, the controller 120 does not change the display of the monitor 102 to be the second ROSI 205, and the controller 120 does not update the transitory head location. This condition of Case A) covers the situation when a driver moves her head sideway toward the left side in order to view a blind spot but the magnitude of the motion is not sufficiently big.

If x−ui>0, then for a next frame, the controller 120 does not change the display of the monitor 102, but the controller 120 does update the transitory head location, (ui, wi), to be, (x, y), the current head position. This condition of Case A) covers the situation when a driver moves her head sideway toward the right side when the monitor 102 is displaying the first ROSI 105, showing a traditional side mirror view. Further this condition of Case A) may be dropped. However, having this condition, allows the view friendly monitor system of Example 5 to self-calibrate when a transitory head location (ui, wi) is too far toward the left side, having a value for ui which is too small. Since x−ui>0 in this condition, updating the transitory head location, (ui, wi) to be, (x, y), would make the new ui (which is x now) to be greater than the old ui (which is ui before the update).

Case B) the Current Display on the Monitor 102 is the Second ROSI 205:

If the magnitude of Ti is greater than a preset value, dx, and x−ui≥0, then for a next frame, the controller 120 changes the display of the monitor 102 to be the first ROSI 105, and the controller 120 updates the transitory head location to be, (x, y), the current head position. This condition of Case B) covers the situation when a driver moves her head sufficiently sideway toward the right side in order to switch the monitor 102 view from showing the second ROSI 205, a view of a blind side, to showing the first ROSI 105, a traditional side mirror view.

If the magnitude of Ti is not greater than a preset value, dx, and x−ui≥0, then for a next frame, the controller 120 does not change the display of the monitor 102 to be the first ROSI 105, and the controller 120 does not update the transitory head location. This condition of Case B) covers the situation when a driver moves her head sideway toward the right side in order to have a view of a traditional side mirror but the magnitude of the motion is not sufficiently big.

If x−ui<0, then for a next frame, the controller 120 does not change the display of the monitor 102, but the controller 120 does update the transitory head location, (ui, wi), to be, (x, y), the current head position. This condition of Case B) covers the situation when a driver moves her head sideway toward the left side when the monitor 102 is displaying the second ROSI 205, showing a blind spot. Similar to the Case A), this condition of Case B) may be dropped. However, having this condition, allows the view friendly monitor system of Example 5 to self-calibrate when a transitory head location (ui, wi) is too far towards the right side, having a value for ui which is too big. Since x−ui<0 in this condition, updating the transitory head location, (ui, wi) to be, (x, y), would make the new ui (which is x now) to be smaller than the old ui (which is ui before the update).

Figure 20:
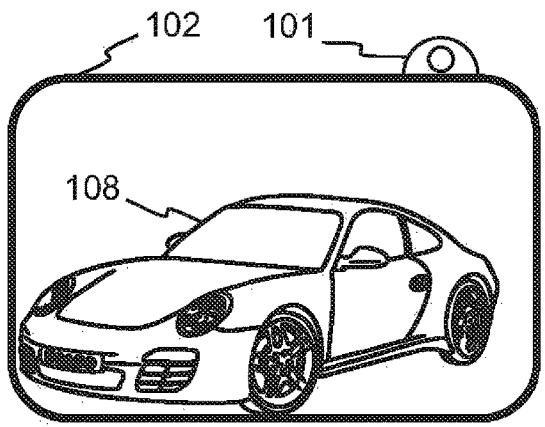
FIG. 20 illustrates a view friendly monitor showing a second ROSI.

Referring to FIGS. 19A and 19B, the driver of the vehicle 160 sees the first ROSI 105 displayed on the monitor 102. If the driver desires to survey his blind spot, the second ROSI 205 on the right side of the vehicle 160, then he would move his head toward the left. The controller 120 would detect this motion of the head through images it receives from the second camera 150; the controller 120 would select the second ROSI 205 when the magnitude of Ti becomes greater than dx. The ROSB 205 is shown in FIG. 19B by dotted outline. The selected second ROSI 205, as shown in FIG. 20, reveals a sports car in the left side blind spot of the driver.

Now if the driver of the vehicle 160 desires the monitor 102 to display a traditional side mirror view, or equivalently to display the first ROSI 105 instead of the second ROSI 205, then he would move his head toward the right side. The controller 120 would detect this motion of the head through images it receives from the second camera 150; the controller 120 would select the first ROSI 105 when the magnitude of Ti becomes greater than dx. The first ROSI 105 is shown in FIG. 19B by solid outline.

Thus, the view friendly monitor of the Example 5 enables easy access to areas of a view in a blind spot of a driver.

Figure 6:
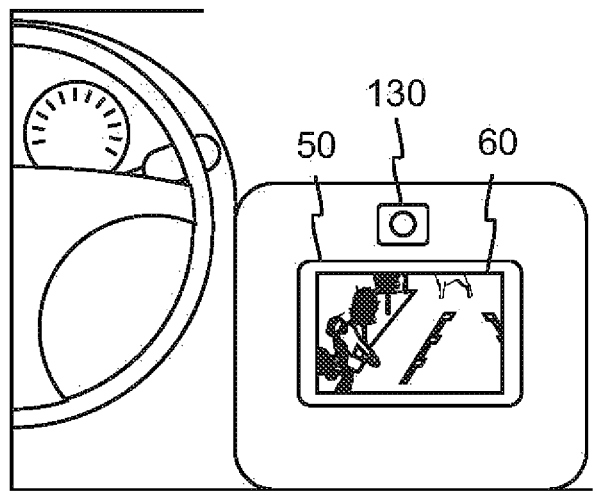
FIG. 6 illustrates an inside vehicle monitor and a second camera.

For Example 1, above, the predetermined face location may be programmed into the controller 120 when a driver of the automobile 45 turns the automobile on, for example. The driver would alert the controller 120 to program the predetermined face location using a data entry knob, and the controller would find the location of the driver's face or head using face detection of the images from the second camera 130, as shown in FIG. 6. Then, the controller would register the location as the predetermined face location. In addition, face recognition data may be collected at the same time.

Another method for finding the predetermined face location is to configure the controller 120 to average the location of the face of the driver over a period of time, and use the average as the predetermined face location. Yet another method is to take the first incident of a positive face detection and use the location of the detected face as the predetermined face location. In the examples, one may track changes in the size of the detected head or face. One may increase the size of the region of special interest if the size of the detected head increases and, vice versa, one may decrease the size of the region of special interest if the size of the detected head decreases. Of course, the resized region is scaled appropriately to fit the display.

In Example 2, to handle the situation when more than one face is detected, the controller may be configured to first do face recognition and then follow the movements of the face of a recognized user.

Alpha does not have to be the same for all directions of head movements. Alpha may have a larger magnitude for the up and down directions than for the left and right directions. This would reduce the need for big head movements in the up and down direction making the system easier to use.

For Example 3, the predetermined face location may be programmed into the controller 120 when a driver of the vehicle 160 turns the automobile on. The driver would alert the controller 120 to program the predetermined face location using a data entry knob, and the controller would find the location of the driver's face or head using face detection of the images from the second camera 150, as shown in FIG. 11. Then, the controller would register the location as the predetermined face location. In addition, face recognition data may be collect at the same time.

For Example 3, the first camera 101 and the second camera 150 might be the same. In other words, the second camera 150 may be eliminated, and the first camera 101 may perform the task of the second camera 150 in addition to its own tasks. That is, the camera 101 may be used to track the movements of the face or the head of a driver of the vehicle 160. To this end, a wide angle lens may be used on the camera 101 so that the camera view would include not only the view 103 but also would include the face of the driver to the right of the view 103.

In Example 5, a view friendly monitor system may have a predetermined distance, dx1, for sideway head movements toward right and may have a different predetermined distance, dx2, for sideway head movements toward left. Another view friendly monitor system may have a variable predetermined distance dx in the sense that a driver may adjust the value of dx using a knob or other data entry means.

Face detection algorithms detect most features of a face, for example mouth, nose, and eyes. Embodiments of the present invention demonstrate using head/face movement detection. But the invention could have been demonstrated using motion detection of other face feature, for example mouth, nose, and eyes.

Here, a distinction can be made between sight of vision detection and movement detection of head or face features. Sight of vision detection concerns with detecting where the eyes are focused on and generally require accurately calibrated sensors to ensure that actual locations where the eyes are focused and their representations generated based on sensors are close. But movement detection of head or face features concerns with measuring movements of face features, and it does not require the type of accurate calibration that sight of vision detection requires. This is more so when a transitory head (a face feature) location is used.

In applications where uninterrupted and focused vision is important, movement detection of head or face features is advantageous to sight of vision detection because it is much easier to move one's head, keeping a focused vision on a target, than when someone is trying to accomplish both using the movement of their vision to control a system and keeping a focused vision on a target.

In this disclosure, the examples are applications where focused vision is important.

In all examples, if the second camera 130 loses its senility at low light—for instance at nights, then one may configure the examples to switch to a night vision camera when dark. The other cameras could be switched to night vision cameras similarly.

Other friendly methods, such as voice commands, may be used in addition to head movements and/or face movements to notify the controller which region in the view we would like to see. In this case, there may be a list of predetermined voice commands. A user would utter a command from the list to inform the controller about a region he would like to see. Here, the view friendly monitor would need a vice detector instead of the camera and a speech recognition capability instead of the face detection capability in the controller. Another application of view friendly monitor systems is a computer with a view friendly monitor system, where the computer monitor displays only a central region of a view of the computer screen and where a user accesses a boundary region of the view by moving his head in a direction related to the direction of the boundary with respect to a predetermined screen location. The view friendly monitor system, first, detects the head movements using a camera or a web camera, second the boundary region is displayed on the screen. The view friendly monitor system uses the computer for its controller.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A view friendly monitor system comprising:
an image source operable to produce a sequence of views;
a camera operable to produce a sequence of images;
a monitor operable to display a current display; and
a controller operable to:
receive the sequence of views from the image source and the sequence of images from the camera;
detect a face in the sequence of images from the camera;
find a relative distance of the detected face from a transitory reference face location;
   select a selected region in the view of the image source based on the relative distance and the current display;
   update the current display in the monitor to be the selected region;
     set the transitory reference face location to a location of the detected face; and
     repeat said detecting the face, finding the relative distance, selecting the selected region, updating the current display, and setting the transitory reference face location one or more times.

2. The view friendly monitor system of claim 1, the controller operable to select the selected region to the right of the current display when the detected face is at the right of the transitory reference face location and the relative distance is greater than or equal to a predetermined value.

3. The view friendly monitor system of claim 1, the controller operable to select the selected region to the left of the current display when the detected face is at the left of the transitory reference face location and the relative distance is greater than or equal to a predetermined value.

4. The view friendly monitor system of claim 1, wherein the sequence of views comprises a first region of special interest and a second region of special interest to the left of the first region of special interest, wherein when the current display is set to the first region of special interest and the detected face is at the right of the transitory reference face location, the controller is operable to set the current display to the second region of special interest.

5. The view friendly monitor system of claim 1, wherein the sequence of views comprises a first region of special interest and a second region of special interest to the left of the first region of special interest, wherein when the current display is set to the second region of special interest and the detected face is at the left of the transitory reference face location, the controller is operable to set the current display to the first region of special interest.

6. The view friendly monitor system of claim 1, the controller operable to select the selected region to the right of the current display when the relative distance is greater than or equal to a predetermined value and the detected face is at the left of the transitory reference face location.

7. The view friendly monitor system of claim 1, the controller operable to select the selected region to the left of the current display when the relative distance is greater than or equal to a predetermined value and the detected face is at the right of the transitory reference face location.

8. The view friendly monitor system of claim 1, wherein the camera is a first camera, the view friendly monitor system further comprising a night vision second camera operable to produce a sequence of images, the controller operable to switch using the sequence of images from the night vision second camera instead of the sequence of images from the first camera when a level of light is below a threshold.

9. The view friendly monitor system of claim 1 further comprising a voice detector, the controller operable to:
receive a voice command, through the voice detector;
performing voice recognition to identify a region of interest indicated in the voice command; and
display, on the monitor, the region of interest indicated in the voice command.

10. A method for providing a view friendly monitor, comprising:
receiving, by a controller, a sequence of views from an image source;
receiving, by the controller, a sequence of images from a camera;
selecting, by the controller, a first region of interest from a plurality of regions of interest in the sequence of views;
displaying the first region of interest on a monitor;
detecting, by the controller, a face in the sequence of images from the camera;
determining a relative distance of the detected face from a transitory reference face location;
when the relative distance is greater than a threshold distance:
selecting, by the controller, a second region of interest from the plurality of regions of interest, the second region of interest different than the first region of interest;
displaying the second region of interest in the monitor; and
setting the transitory reference face location to a location of the detected face; and
when the relative distance is less than or equal to the threshold distance, continue displaying the first region of interest in the monitor.

11. The method of claim 10, further comprising selecting, by the controller, the second region of interest to the right of the first region of interest when the detected face is at the right of the transitory reference face location and the relative distance is greater than the threshold distance.

12. The method of claim 10, further comprising selecting, by the controller, the second region to the left of the first region of interest when the relative distance is greater than the threshold distance and the face is detected at left of the transitory reference face location.

13. The method of claim 10, further comprising selecting, by the controller, the second region of interest to the left of the first region of interest when the relative distance is greater than the threshold distance and the face is detected is at the right of the transitory reference face location.

14. The method of claim 10, further comprising selecting, by the controller, the second region of interest to the right of the first region of interest when the relative distance is greater than the threshold distance and the face is detected at the left of the transitory reference face location.

15. The method of claim 10, further comprising:
by the controller, receiving a voice command identifying a region of interest to display on the monitor; and
by the controller, displaying the region of interest identified by the voice command on the monitor.

16. The method of claim 10, further comprising:
receiving a value for the threshold distance from a data entry control; and
changing the threshold distance from a current value to the value received from the data entry control.

17. A view friendly monitor system comprising:
a controller configured to:
receive a sequence of views from an image source and a sequence of images from a camera;
select a first region of interest from a plurality of regions of interest in the sequence of views;
display, in a monitor, the first region of interest;
detect a face in the sequence of images from the camera;
determine a relative distance of the detected face from a transitory reference face location;
when the relative distance is greater than a threshold distance:
select a second region of interest from the plurality of regions of interest, the second region of interest different than the first region of interest;
display the second region of interest in the monitor; and
set the transitory reference face location to a location of the detected face; and
when the relative distance is less than or equal to the threshold distance, continue displaying the first region of interest in the monitor.

18. The view friendly monitor system of claim 17, wherein the controller is configured to:
select the second region of interest to the left of the first region of interest when the relative distance is greater than the threshold distance and the face is detected at right of the transitory reference face location; and
select the second region of interest to the right of the first region of interest when the relative distance is greater than the threshold distance and the face is detected at left of the transitory reference face location.

19. The view friendly monitor system of claim 17, wherein the controller is configured to:
select the second region of interest to the left of the first region of interest when the relative distance is greater than the threshold distance and the face is detected at left of the transitory reference face location; and
select the second region of interest to the right of the first region of interest when the relative distance is greater than the threshold distance and the face is detected at right of the transitory reference face location.

20. The view friendly monitor system of claim 17 further comprising a data entry control configured to change a value of said threshold distance.

21. The view friendly monitor system of claim 17, wherein the controller is configured to detect the face in the sequence of images from the camera by measuring movements of the head without performing sight of vision detection.

* * * * *